United States Patent [19]

Ohgaki et al.

[11] Patent Number: 5,793,557

[45] Date of Patent: Aug. 11, 1998

[54] SIGNAL REPRODUCING APPARATUS

[75] Inventors: Hiroshi Ohgaki, Yokohama; Yasutaka Sasajima, Yokosuka, both of Japan

[73] Assignee: Victor Company of Japan, Ltd., Yokohama, Japan

[21] Appl. No.: 622,913

[22] Filed: Mar. 27, 1996

Related U.S. Application Data

[63] Continuation of Ser. No. 245,479, May 17, 1994, abandoned.

[30] Foreign Application Priority Data

| May 17, 1993 | [JP] | Japan | 5-139061 |
| May 17, 1993 | [JP] | Japan | 5-139062 |
| Oct. 22, 1993 | [JP] | Japan | 5-287550 |
| Feb. 15, 1994 | [JP] | Japan | 6-040503 |

[51] Int. Cl.$^6$ .................. G11B 15/467; G11B 5/584
[52] U.S. Cl. .................. 360/77.13; 360/64
[58] Field of Search .............. 360/77.13, 77.12, 360/61, 64, 73.05, 73.08

[56] References Cited

U.S. PATENT DOCUMENTS

| 4,714,970 | 12/1987 | Edakube . |
| 4,905,108 | 2/1990 | Otokawa .................. 360/73.05 X |
| 5,088,077 | 2/1992 | Lemoine .................. 360/77.14 X |
| 5,107,381 | 4/1992 | Mitsuhashi et al. .......... 360/77.13 X |
| 5,243,474 | 9/1993 | Mitsuhashi .............. 360/77.13 X |
| 5,289,323 | 2/1994 | Trcka et al. .............. 360/77.13 |
| 5,295,022 | 3/1994 | Tanaka et al. ............. 360/77.13 X |
| 5,309,299 | 5/1994 | Crossland et al. .......... 360/77.12 X |

FOREIGN PATENT DOCUMENTS

| 0 087 811 | 9/1983 | European Pat. Off. . |
| 0 443 810 | 8/1991 | European Pat. Off. . |
| 2-123548 | 5/1990 | Japan . |

*Primary Examiner*—Aristotelis M. Psitos
*Assistant Examiner*—James L. Habermehl
*Attorney, Agent, or Firm*—Michael N. Meller

[57] ABSTRACT

A signal reproducing apparatus realizes an auto-tracking in reproducing a plurality of recorded signals simultaneously with a simple construction. The signal reproducing apparatus is featured by comprising a plurality of reproducing circuits for reproducing a plurality of recorded signals from a plurality of tracks TQ1, TQ2, TP1, TP2, TA1 and TA2 formed on a recording medium, a plurality of amplitude level detection circuits for detecting amplitudes of at least two of output signals of the reproducing circuits and an operation circuit for generating a tracking control signal from a signal obtained by processing the amplitude level detection signals from the amplitude level detection circuits in a predetermined manner.

4 Claims, 23 Drawing Sheets

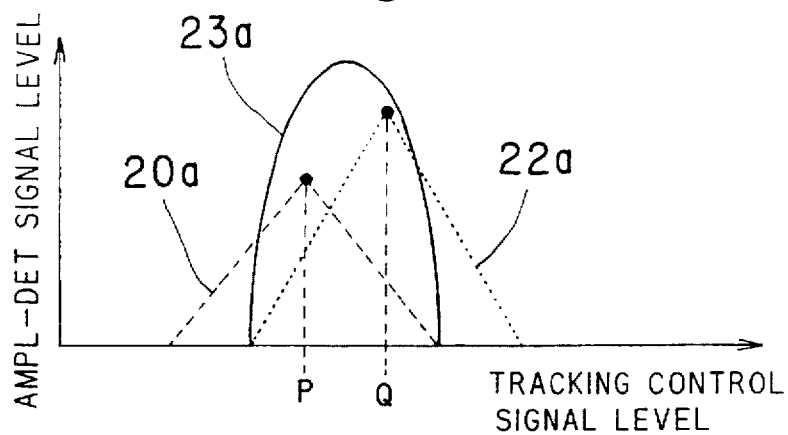
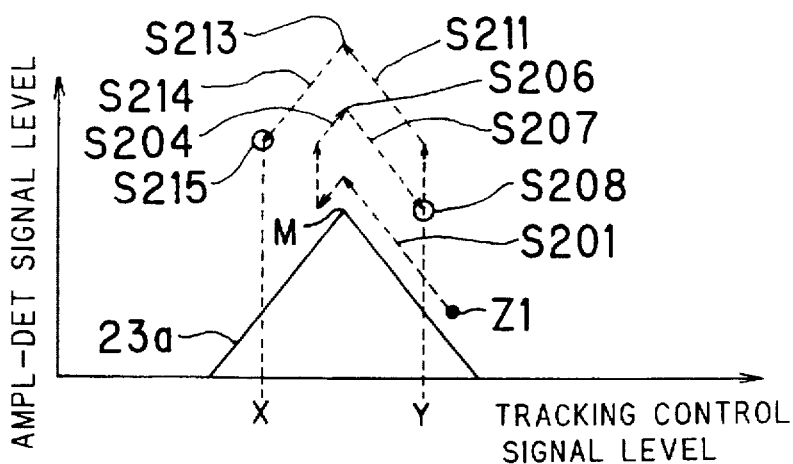
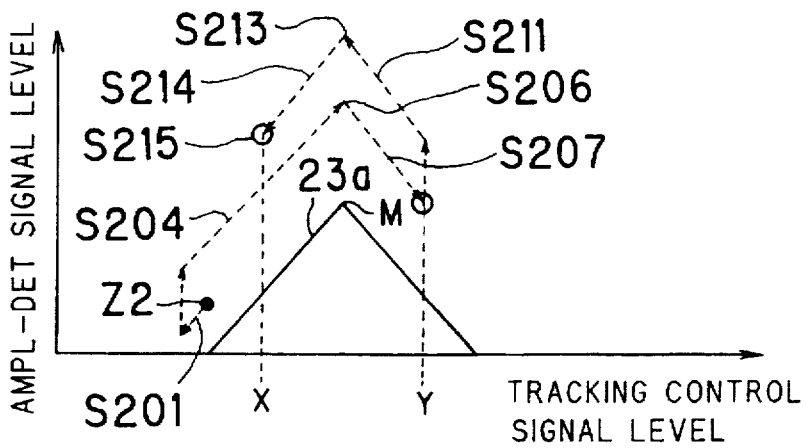

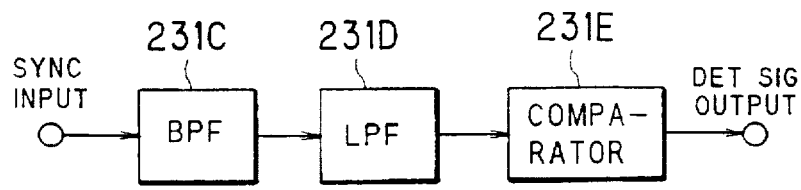
Fig.27
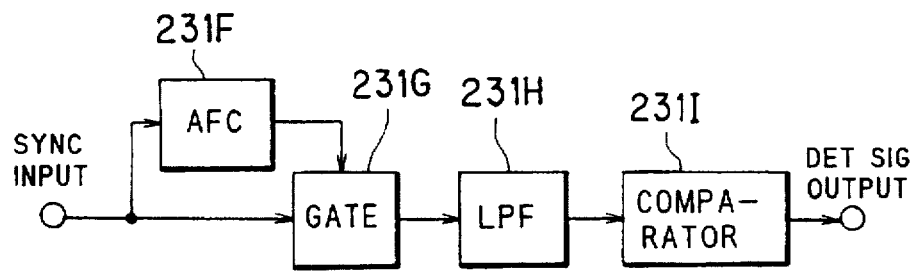
Fig.28
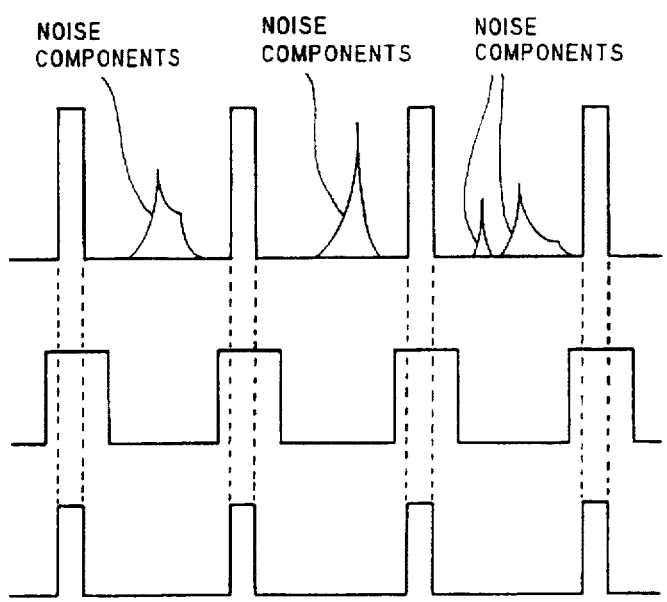
Fig.29(A) INPUT SYNC SIGNAL
Fig.29(B) PULSE OUTPUT
Fig.29(C) LPF INPUT 5,793,557

1

SIGNAL REPRODUCING APPARATUS

This application is a continuation of application Ser. No. 08/245,479, filed May 17, 1994 now abandoned.

BACKGROUND OF THE INVENTION

1. Field of the Invention

The present invention relates to a signal reproducing apparatus and, particularly, to a signal reproducing apparatus suitable to reproduce a plurality of signals of various kinds simultaneously from a recording medium on which the plurality of the signals obtained by dividing a video signal are recorded.

2. Related to the Prior Art

FIG. 1 shows a conventional tape pattern and FIG. 2 is a block diagram showing a conventional video signal reproducing apparatus. Conventional techniques will be described with reference to these figures.

In a conventional video signal reproducing apparatus (referred to as "VTR", hereinafter), one track is formed per one video field as shown in FIG. 1 by using a pair of magnetic heads H1 and H2 arranged on a rotary drum with a space of 180 degrees therebetween.

An auto-tracking has been known, in which, in reproducing signals on a magnetic tape T, a tracking is performed on the basis of an amplitude level of a reproduced signal. A VTR which performs such tracking will be described with reference to FIG. 2. In FIG. 2, signals reproduced from the magnetic tape T by means of the magnetic heads H1 and H2 are supplied to a selecting circuit 3 through preamplifiers 1 and 2. Since the recorded signal is reproduced by the magnetic heads H1 and H2 arranged on the rotary drum with a space of 180 therebetween, when one of the preamplifiers 1 and 2 outputs a signal, the other preamplifier does not. The selecting circuit 3 selects these output signals of the preamplifiers by using drum pulse which is synchronous with rotation of the rotary drum to form a continuous signal which is supplied to a reproduced signal processing circuit 4 and a rectifier circuit 5. The reproduced signal processing circuit 4 sends a reproduced video signal 4a obtained by demodulating an FM modulated video signal to a transmission line which is not shown.

On the other hand, the output signal of the selecting circuit 3, which is supplied to the rectifier circuit 5, is half-wave or full-wave rectified thereby and then filtered by an integration circuit 6 to remove its high frequency component, resulting in an amplitude level detection signal 6a corresponding to an amplitude level of the reproduced signal. The amplitude level detection signal 6a is supplied to an operation circuit 7 composed of such as CPU to produce a control signal 7a such that the amplitude level detection signal 6a becomes maximum and the control signal 7a is supplied to a capstan servo control system which is not shown and which controls a running speed of the magnetic tape T such that a positional relationship between the magnetic heads H1 and H2 and the magnetic tape T becomes optimal.

In the conventional technique, the tracking servo control is performed such that amplitude level of a reproduced signal of one channel becomes optimal, as mentioned above.

On the other hand, the applicant of this application has proposed a VTR for dividing and recording a high definition video signal (Japanese Patent Application H5-73067). A tape pattern obtainable by such VTR is shown in FIG. 3 includes three tracks per field. That is, magnetic heads A1, WP2 and

2

WQ1 shown in FIG. 3 record or reproduce simultaneously as a first channel and magnetic heads A2, WP1 and WQ2 record or reproduce simultaneously as a second channel. The magnetic heads A1 and A2 among them are used for audio signal and the magnetic heads WP2 and WQ1 and the magnetic heads WP1 and WQ2 are used for video signal.

In case where such tape pattern is reproduced, there are reproduced signals of two kinds related to the magnetic heads WP1 and WP2 and the magnetic heads WQ1 and WQ2, respectively. Particularly, in case of separate recording and reproducing in which a recording device and a reproducing device are independent from each other and the recording and reproducing operations are performed without using common heads and common tape running device, one of the two reproduced signals does not always in highest level while the other reproduced signal is in highest level, due to difference in mounting height between the magnetic heads and/or slight difference in lead angle of the rotary drum for guiding the magnetic tape. Therefore, a concord of the both signals is necessary. However, it is impossible to obtain such concord in the above mentioned tracking system.

SUMMARY OF THE INVENTION

An object of the present invention is to provide a signal reproducing apparatus suitable for use in reproducing different kinds of signals simultaneously.

In order to achieve the above object, the present invention provides, according to an aspect thereof, a signal reproducing apparatus which comprises a plurality of reproducing means for reproducing a plurality of reproducing signals from a plurality of tracks formed on a recording medium, switching means for sequentially switching the plurality of the reproduced signals with a predetermined period, amplitude level detection means for detecting amplitude level of an output of the switching means, level integration means for integrating an output signal of the amplitude detection means and servo control means for controlling a running speed of the recording medium on the basis of an output of the integration means.

According to another aspect of the present invention, a signal reproducing apparatus is provided which comprises a plurality of reproducing means for reproducing a plurality of reproducing signals from a plurality of tracks formed on a recording medium, a plurality of amplitude level detection means each for detecting amplitude levels of at least two of operation means for producing a tracking control signal by detection signals of the plurality of the amplitude level detection means in a predetermined manner.

According to another aspect of the present invention, a signal reproducing apparatus is provided which comprises a plurality of reproducing means for reproducing a plurality of reproducing signals from a plurality of tracks formed on a recording medium, a plurality of amplitude level detection means each for detecting amplitude levels of at least two of output signals of the plurality of the reproducing means, multiplying or adding means for multiplying output signals operation means for producing a tracking control signal on the basis of an output signal of the multiplying or adding means.

According to another aspect of the present invention, a signal reproducing apparatus is provided which comprises a plurality of reproducing means for reproducing a plurality of reproducing signals from a plurality of tracks formed on a recording medium, switching means for sequentially switching the plurality of the reproduced signals with a predetermined period, amplitude level detection means for detecting amplitude levels of an output of the switching means, level integration means for integrating an output signal of the amplitude detection means and servo control means for controlling a running speed of the recording medium on the basis of an output of the integration means.

According to a further aspect of the present invention, a signal reproducing apparatus is provided which comprises a plurality of reproducing means for reproducing a plurality of reproducing signals from a plurality of tracks formed on a recording medium, a plurality of amplitude level detection means for detecting amplitude levels of at least two of output signals of the plurality of the reproducing means, a plurality of level limiter means for outputting only output signals of the plurality of the amplitude level detection means not lower than a predetermined level, multiplying means for multiplying output signals of the plurality of the level limiter means and operation means for producing a tracking control signal on the basis of an output of the multiplying means.

According to a further aspect of the present invention, a signal reproducing apparatus is provided which comprises a plurality of reproducing means for reproducing a plurality of a first category of reproducing signals [Time Compressed Integration (TCI) Signals] related to video signal) from a plurality of tracks formed on a recording medium, a plurality of amplitude level detection means for detecting amplitude levels of at least two of output signals of the plurality of the reproducing means, a detection signal generating means for detecting presence or absence of amplitude level of a second kind of the reproduced signals (audio signals) and operation means for producing a tracking control signal by means of a signal obtained by operating amplitude level detection signals of the plurality of the amplitude level detection means in a predetermined manner and an output signal of the detection signal generating means.

According to a further aspect of the present invention, a signal reproducing apparatus is provided which comprises amplitude level detection means for detecting an amplitude level of at least one of a plurality of reproduced signals reproduced from a recording medium, synchronizing signal detection means for detecting synchronizing signals from the plurality of the reproduced signals and control signal producing means for producing a control signal for controlling a reproducing scan in reproducing the plurality of the reproduced signals on the basis of an amplitude level detection signal outputted by the amplitude level detection means and a detection signal from the synchronizing signal detection means.

According to a further aspect of the present invention, a signal reproducing apparatus is provided which comprises a plurality of reproducing means for reproducing a plurality of reproducing signals from a plurality of tracks formed on a recording medium, amplitude level detection means for detecting amplitude levels of a plurality of output signals of the plurality of the reproducing means, synchronizing signal detection means for detecting synchronizing signals from the plurality of the reproduced signals and tracking control signal producing means for producing a tracking control signal for controlling a reproducing scan of the plurality of the reproducing means on the basis of an amplitude level detection signal outputted by the amplitude level detection means and a detection signal from the synchronizing signal detection means.

According to a further aspect of the present invention, a signal reproducing apparatus is provided which comprises amplitude level detection means for detecting amplitude levels of at least one of output signals of the plurality of the reproducing means, synchronizing signal detection means for detecting synchronizing signals from the plurality of the reproduced signals and tracking control signal producing means for producing a tracking control signal for controlling a reproducing scan of the plurality of the reproducing means on the basis of an amplitude level detection signal outputted by the amplitude level detection means and a detection signal from the synchronizing signal detection means.

BRIEF DESCRIPTION OF THE DRAWINGS

FIG. 20 is a graph showing a relationship between an amplitude level detection signal and a tracking control signal;

FIG. 21 is a graph showing an operation of the operation circuit;

FIG. 22 is a graph showing an operation of the operation circuit;

FIGS. 25, 27 and 28 are block diagrams of examples of the synchronizing signal detection circuit respectively;

FIGS. 29(A) to 29(C) are waveforms useful in understanding the operation of the synchronizing signal detection circuit shown in FIG. 28.

DETAILED DESCRIPTION OF THE PREFERRED EMBODIMENTS

[FIRST EMBODIMENT]

Figure 4:
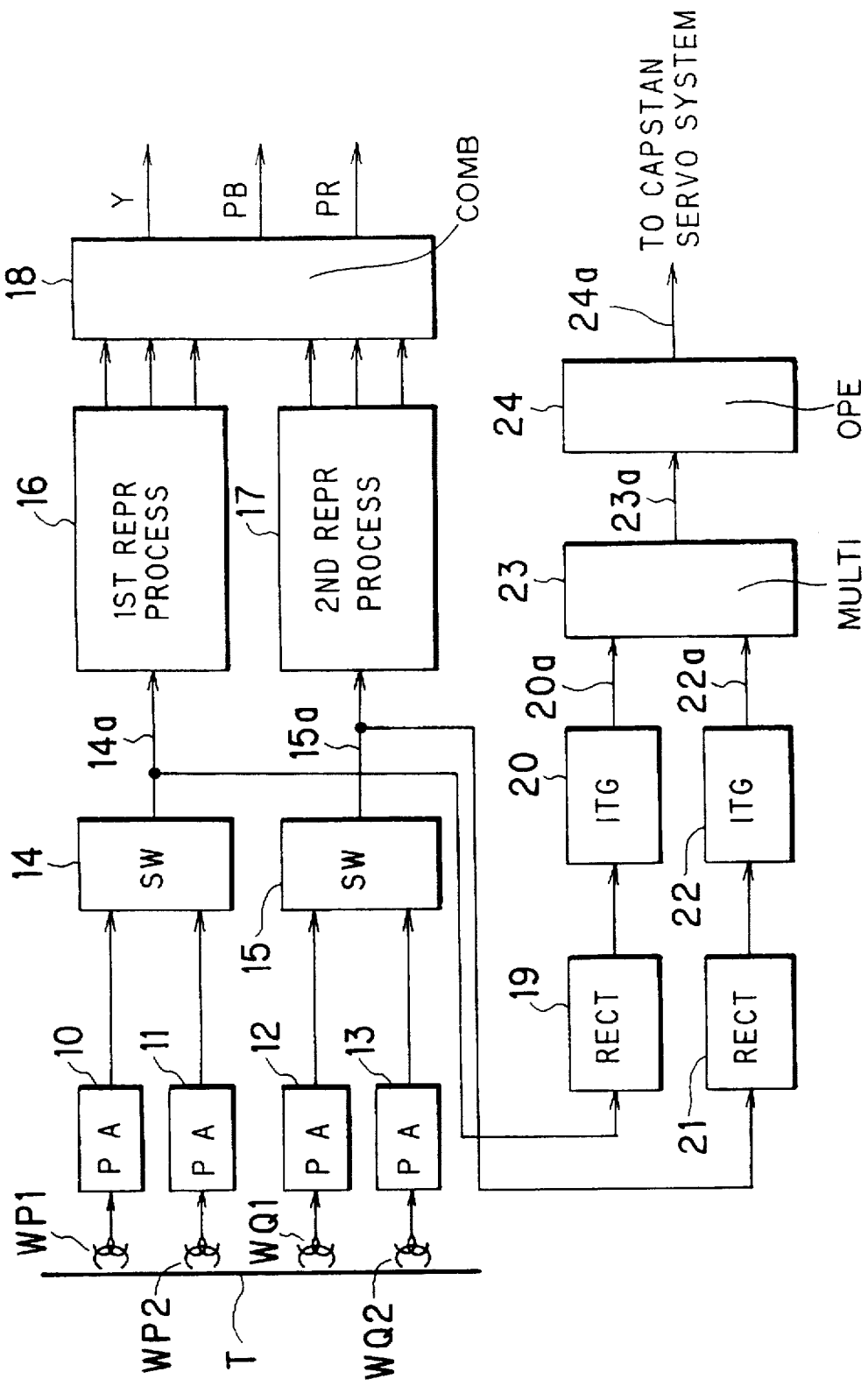
FIG. 4 is a block diagram of a first embodiment of the signal reproducing apparatus according to the present invention.
Figure 5:
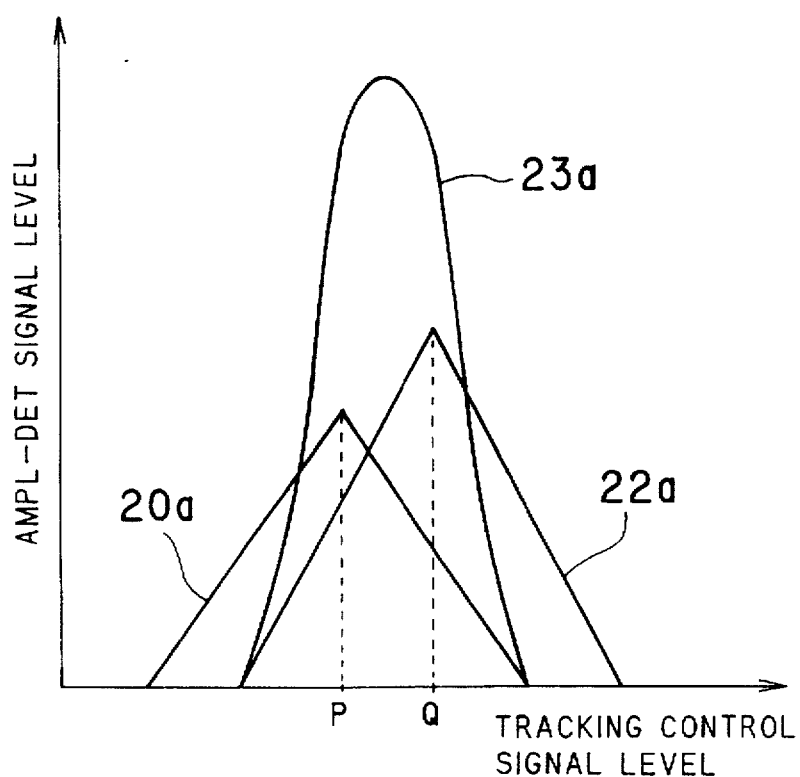
FIG. 5 is a graph showing a relation between an amplitude level detection signal level and a tracking control signal level.
Figure 6:
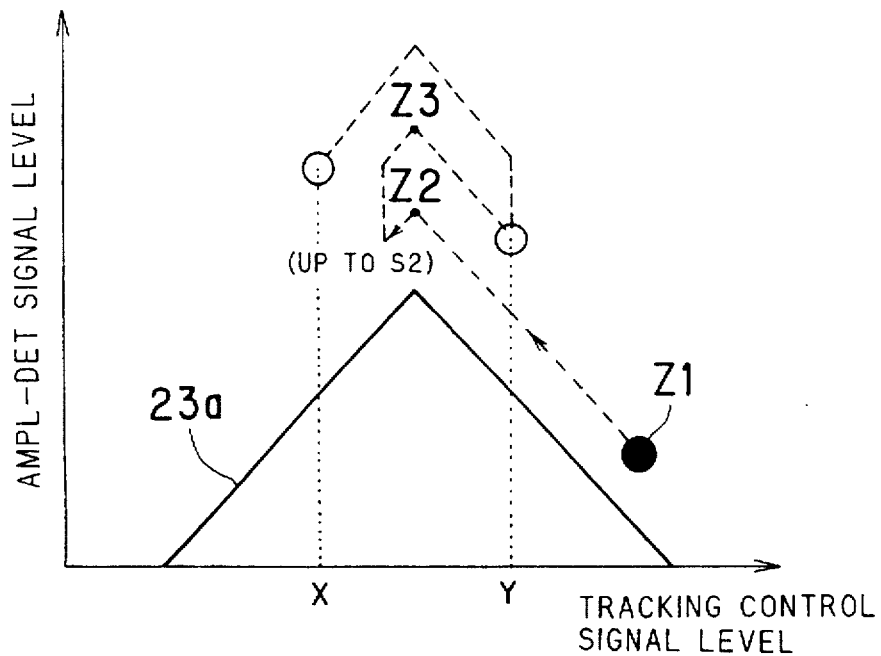
FIG. 6 is an explanatory figure for an operation of an operation circuit with an initial value of tracking control signal being indicated by Z1.
Figure 7:
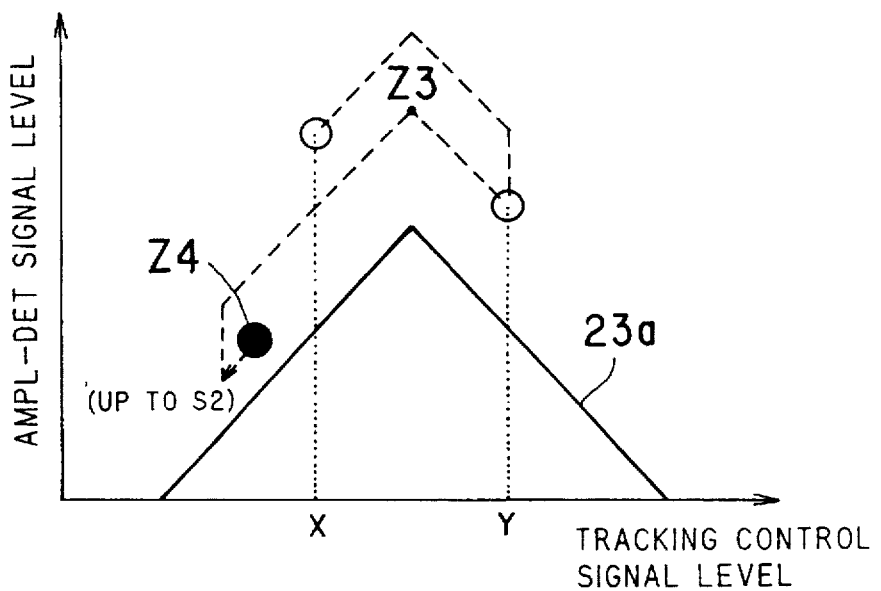
FIG. 7 is an explanatory figure for an operation of an operation circuit with an initial value of tracking control signal being indicated by Z4.
Figure 8:
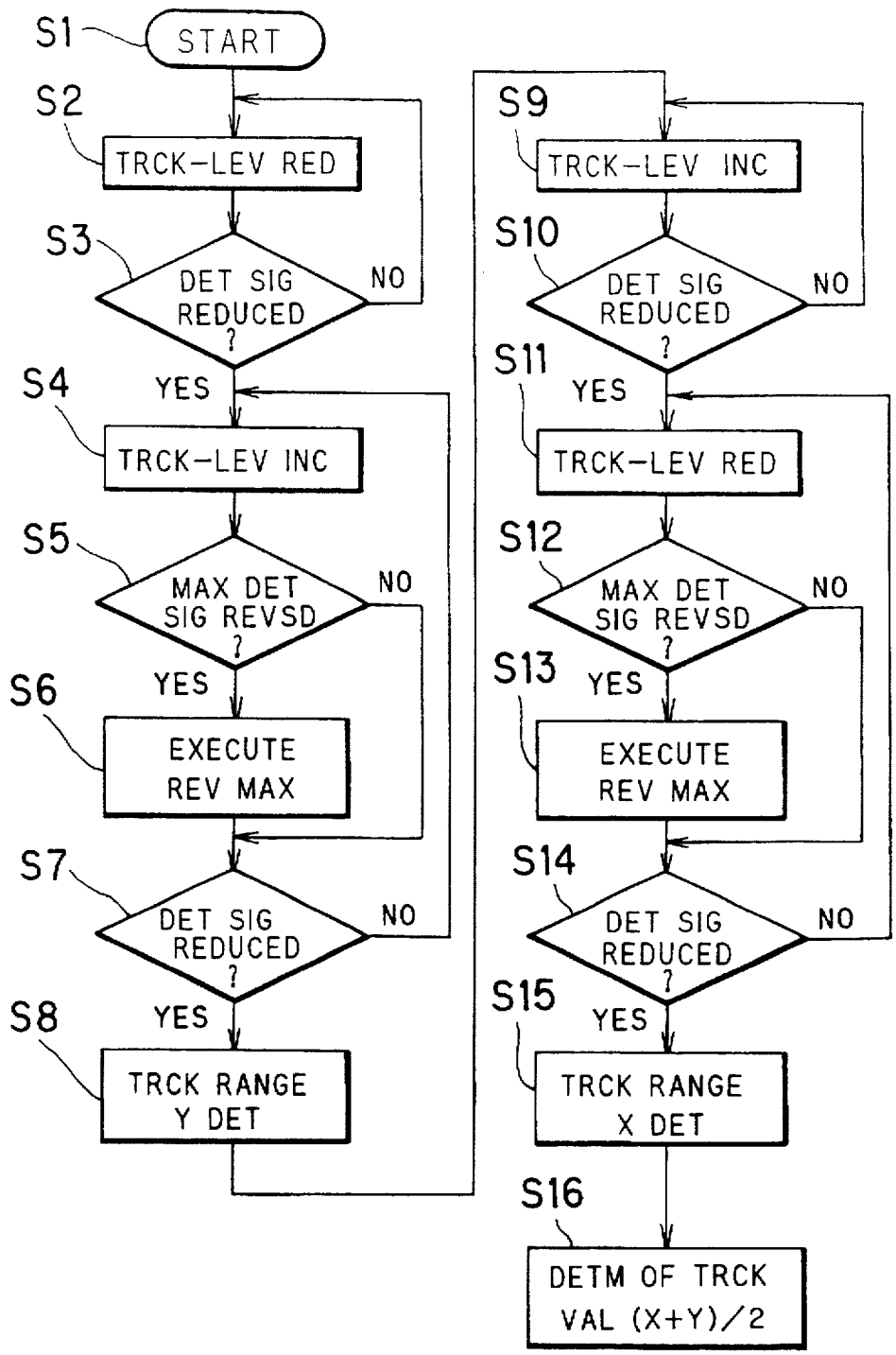
FIG. 8 is a flowchart of operation of an operation circuit.

FIG. 4 is a block diagram of a first embodiment of a signal reproducing apparatus according to the present invention, FIG. 5 is a graph showing a relation between an amplitude level detection signal level and a tracking control signal level, FIG. 6 is an explanatory figure for an operation of an operation circuit when an initial value of tracking control signal is in a right side of a signal output peak, FIG. 7 is an explanatory figure for an operation of an operation circuit when an initial value of tracking control signal is in a left side of the signal output peak and FIG. 8 is a flowchart of operation of an operation circuit.

Figure 1:
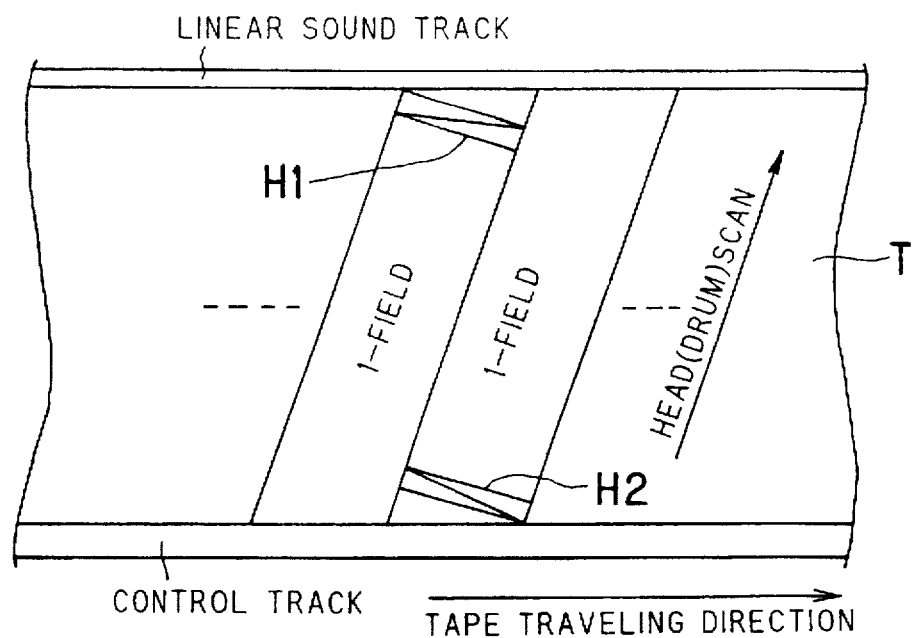
FIG. 1 shows an example of a conventional recording pattern on a tape.
Figure 2:
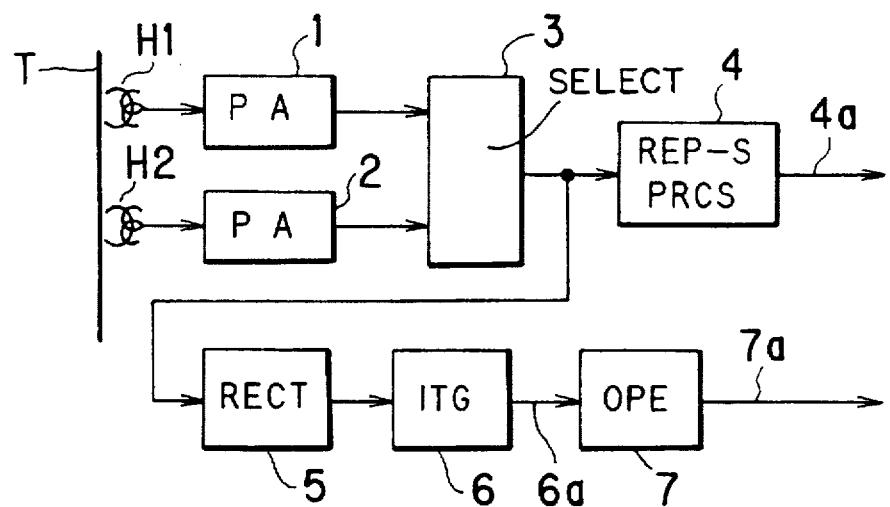
FIG. 2 is a block diagram of a conventional video signal reproducing apparatus.
Figure 3:
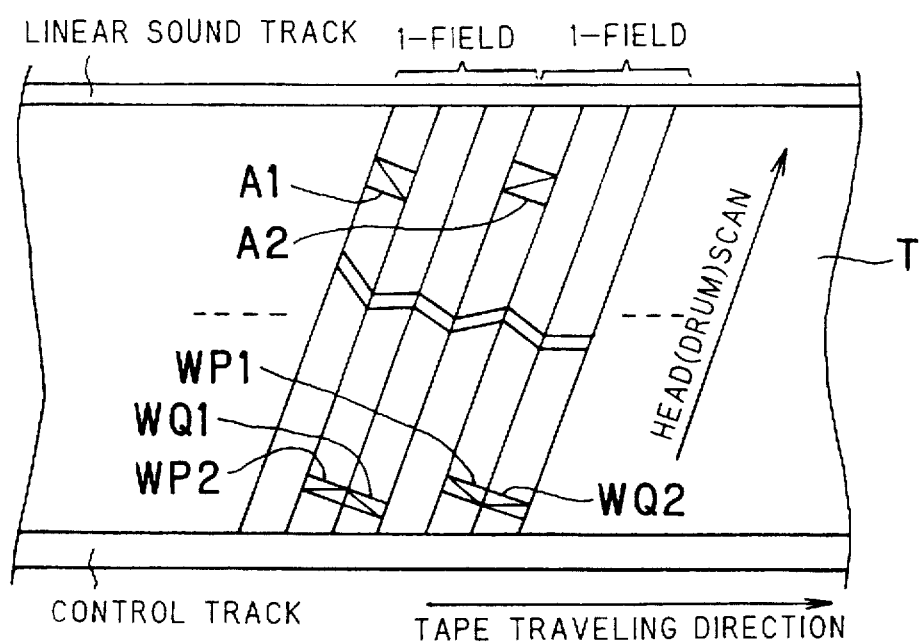
FIG. 3 shows a tape pattern formed by a VTR for dividing and recording a high definition video signal.

In FIG. 4, reproduced signals reproduced from a magnetic tape T having a tape pattern shown in FIG. 3 by using magnetic heads WP1 and WP2 and magnetic heads WQ1 and WQ2 are amplified by preamplifiers 10 to 13 to a predetermined level and then supplied to a first and second switching circuits 14 and 15. The first and second switching circuits 14 and 15 switch the input signals with a timing of drum pulse (not shown) which is synchronized with rotation of a head drum to produce a first and second continuous reproduced signals 14a and 15a which are supplied to a first and second reproduction processing circuits 16 and 17 respectively.

Since the first and second reproduced signals 14a and 15a are those obtained by FM modulating TCI signals each of which is a time division multiplex of a compressed luminance signal and a compressed line sequential color signal, the first and second reproduction processing circuits 16 and 17 respectively FM demodulate these input signals to expand the compressed luminance signals to obtain Y signals and to expand the line sequential color signals. The first and second reproduction processing circuits 16 and 17 further line sequentially demodulate the expanded line sequential color signals to obtain PB signals and PR signals. The two sets of Y, PB and PR signals are supplied to a combining circuit 18 and resultant Y signal, PB signal and PR signal are sent to a transmission line which is not shown.

Now, the feature of the first embodiment of the present invention which is embodied as rectifier circuits 19 and 21, integration circuits 20 and 22, a multiplier circuit 23 and an operation circuit 24 in FIG. 4 will be described. The first and second reproduced signals 14a and 15a are supplied to the rectifier circuits 19 and 21 and then to the integration circuits 20 and 22 respectively, to obtain a first and second amplitude level detection signals 20a and 22a. In this embodiment, in order to unify these signals, the first and second amplitude level detection signals 20a and 22a are multiplied in the multiplier circuit 23. An output 23a of the multiplier circuit 23, which is a third amplitude level detection signal, is supplied to the operation circuit 24 in which the third amplitude level detection signal 23a is processed to obtain a tracking control signal 24a which is supplied to a capstan servo control system which is not shown.

A relationship between the first to third amplitude level detection signals 20a, 22a and 23a is shown in FIG. 5. The inconsistency between a value "P" of tracking control 120a related to an amplitude level of the first reproduced signal 14a is maximum and a value "Q" of tracking control signal at which the second amplitude level detection signal 22a related to an amplitude level of the second reproduced signal 15a is maximum, is due to a difference in relative height of the respective magnetic heads in the previously mentioned discrete recording and reproducing apparatuses. Thus, the tracking control signal 24a is at least required to have a value between the values "P" and "Q" in order to balance the first and second reproduced signals 14a and 15a. In view of this, the operation processing is performed on the basis of the third amplitude level detection signal 23a.

An operation of the operation circuit 24 will be described with reference to FIGS. 6 to 8. The operation circuit 24 operates to obtain a maximum value of the third amplitude level detection signal 23a, to obtain values X and Y of the tracking control signal 24a when the third amplitude level detection signal 23a has a value below the maximum value by a predetermined level and determine a final tracking control signal from an average value of the values X and Y. In the flowchart shown in FIG. 8, the steps S1 to S8 are to obtain the value "Y" and the steps S9 to S15 are to obtain the value "X". It should be noted that FIGS. 6 and 7 show operations in cases where the initial value of the tracking control signal 24a is in the right side of the peak and it is in the left side of the peak respectively, with tracking being shown in approximation to the third amplitude level detection signal 23a. Further, the "tracking amount" in FIG. 8 indicates a tracking control signal value and the "detection signal" indicates a value of the third amplitude level detection signal.

In FIG. 8, the operation starts from the step S1 and the tracking control signal 24a is reduced in the step S2. Then, in the step S3, it is determined whether or not the third amplitude level detection signal 23a is reduced and, if it is reduced, the operation is advanced to the step S4 and, if not, it returns to the step S2. This operation is repeated until the third amplitude level detection signal 23a is reduced.

That is, when the initial value Z1 is in the right side of the peak as shown in FIG. 6, the third amplitude level detection signal 23a increases as the tracking control signal 24a is reduced. Accordingly, the tracking control signal value is reduced until it reaches a predetermined value after passing through a maximum value Z2, by repeating the steps S2 and S3. On the other hand, when the initial value Z4 is in the left side of the peak as shown in FIG. 7, the tracking control signal value is reduced until it reaches a predetermined value without returning from the step S3 to the step S2.

In the step S4, the tracking amount is increased and, then, it is determined in the step S5 whether or not the value of the third amplitude level detection signal renews a maximum value. If renewed, the operation is advanced to the step S6 and, if not, it is advanced to the step S7.

In the step S6, the maximum value of the third amplitude level detection signal 23a is updated for use in the subsequent processing. After the step S6, the operation is advanced to the step S7. In the step S7, it is determined whether the third amplitude level detection signal 23a is reduced. If reduced, the operation is advanced to the step S8 and, if not, it returns to the step S4 and the steps S4 to S7 are repeated until the signal 23a is reduced. That is, the third amplitude level detection signal 23a is reduced after it passes the maximum value Z3 shown in FIGS. 6 and 7.

In the step S8, the value of the tracking control signal when the third amplitude level detection signal 23a is reduced from its maximum value by a predetermined level is stored in a register as "Y". "X" can be obtained similarly through the steps S9 to S15. In the step S16, "(X+Y)/2" is calculated, resulting in the final tracking control signal 24a.

The tracking servo control for the first and second reproduced signals in the respective two channels can be performed appropriately in this manner.

In the first embodiment, it has been described that in the case where the first reproduced signal and the second reproduced signal are reproduced simultaneously, however, it is possible to simultaneously reproduce more than two signals, in which case, amplitude levels of all of the reproduced signals are obtained, unified by multiplying or adding them to obtain a third amplitude level detection signal on which a tracking servo control is performed. Further, when there is a difference in significance between three or more reproduced signals, it is possible to perform a tracking servo control by using a third amplitude level detection signal obtained by unifying amplitude level detection signals of two or more of these reproduced signals.

Further in the first embodiment, although a magnetic tape is used as the recording medium, the present invention which performs an appropriate tracking servo control by unifying reproduced signals in a plurality of channels, is not limited to such magnetic tape, but is applicable to other recording mediums such as optical disc, magneto-optical disc or magnetic disc.

In the first embodiment, a video signal is used as the signal reproduced from the recording medium. However, this invention is not limited to any specific signal and is also applicable to a mere signal such as audio signal or information signal since the present invention performs an appropriate tracking servo control by unifying reproduced signals of a plurality of channels.

[SECOND EMBODIMENT]

Figure 9:
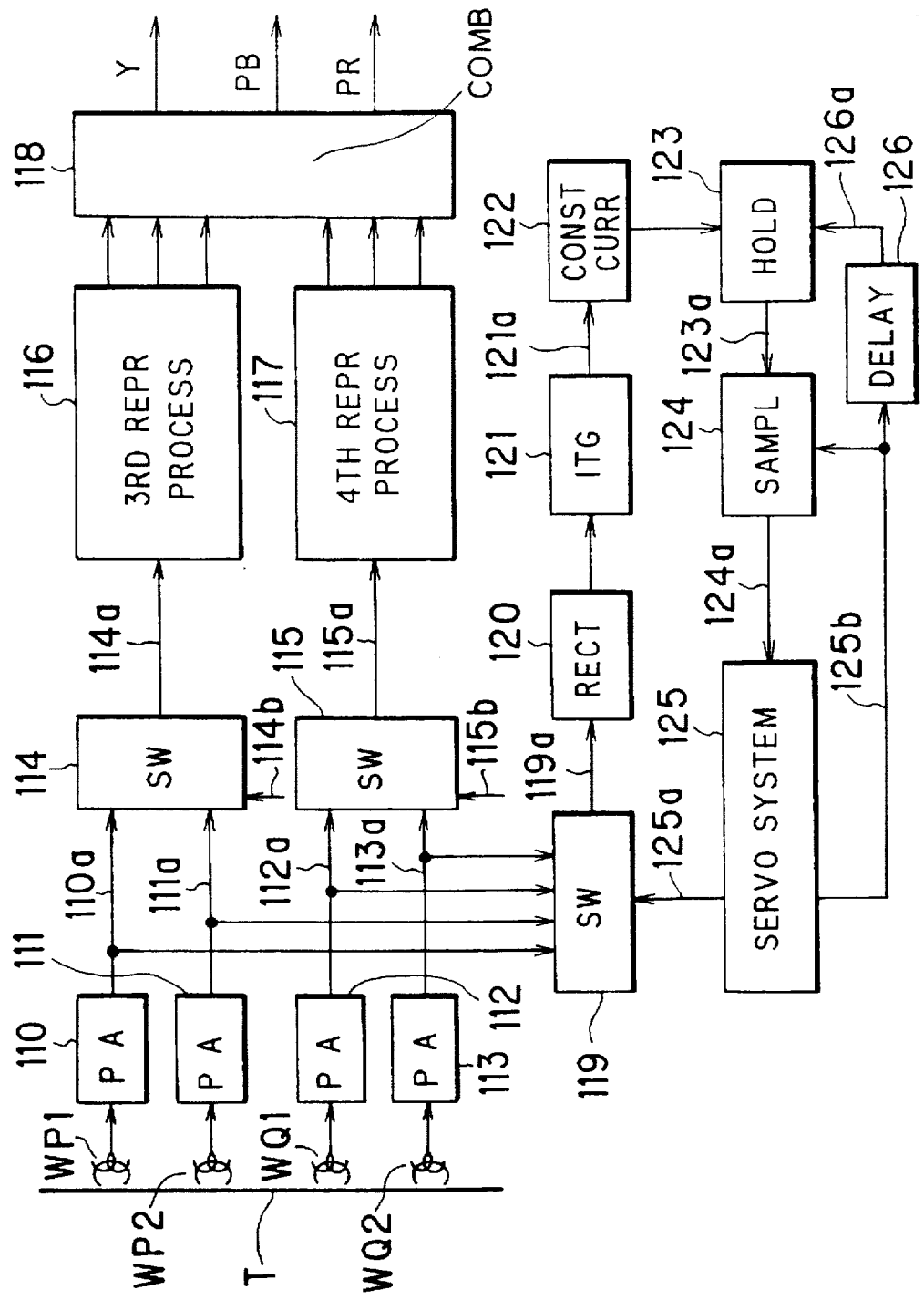
FIG. 9 is a block diagram of a second embodiment of the signal reproducing apparatus according to the present invention.

Further, FIG. 9 is a block diagram of a second embodiment of the signal reproducing apparatus according to the present invention. FIGS. 10(A) to 10(M) show a timing chart of operation of the second embodiment shown in FIG. 9.

Figure 10:
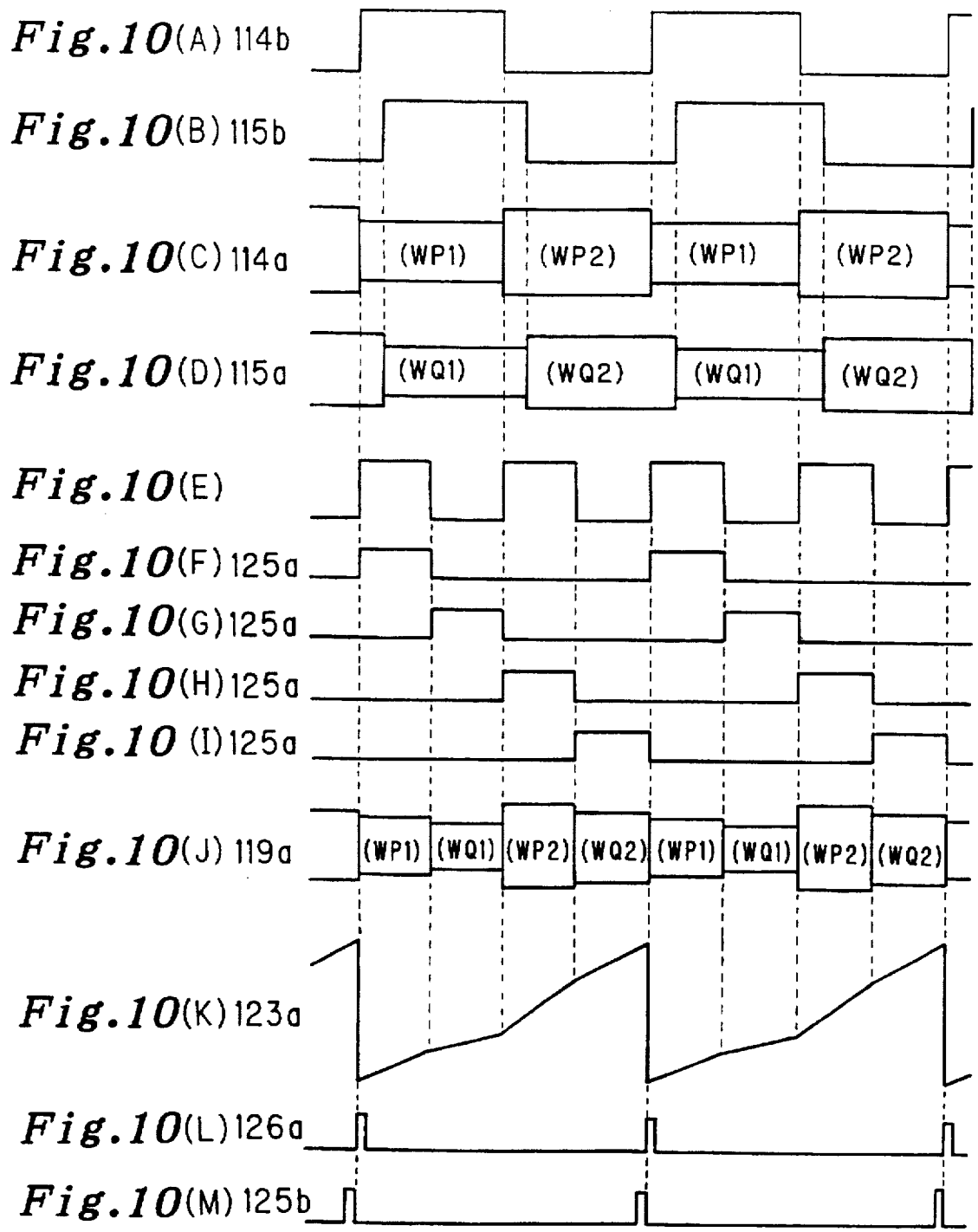
FIGS. 10(A) to 10(M) show a timing chart of operation of the signal reproducing apparatus shown in FIG. 9.

In FIGS. 9 and 10, reproduced signals reproduced from a magnetic tape T having a tape pattern shown in FIG. 3 by using magnetic heads WP1 and WP2 and magnetic heads WQ1 and WQ2 are amplified by preamplifiers 110 to 113 to a predetermined level and signals 110a to 113a obtained by amplifying the reproduced signals are supplied to a third to fifth switching circuits 114, 115 and 119. The third and fourth switching circuits 114 and 115 switch the input signals 110a to 113a with a timing of a first and second drum pulses 114b and 115b [FIG. 10(A) and 10(B)] supplied from an unshown drum servo system to produce third and fourth continuous reproduced signals 114a and 115a shown in FIGS. 10(C) and 10(D) which are supplied to third and fourth reproduction processing circuits 116 and 117 respectively. In FIGS. 10(C) and 10(D) and 10(J), signals indicated by magnetic heads WP1, WP2, WQ1 and WQ2 with parentheses are those related to the respective magnetic heads.

Since the first and second reproduced signals 114a and 115a are those obtained by FM modulating TCI signals each obtained by a time division multiplex of a compressed luminance signal (Y signal) and compressed line sequential color signals (PB and PR signals), the third and fourth reproduction processing circuits 116 and 117 FM demodulate these input signals to expand the compressed luminance signals and the line sequential color signals. The third and fourth reproduction processing circuits 116 and 117 further line sequentially demodulate the expanded line sequential color signals, resulting in two sets of Y signals, PB signals and PR signals. The two sets of Y, PB and PR signals are supplied to a combining circuit 118 and the resultant Y signal, PB signal and PR signal are sent to a transmission line which is not shown.

Now, the feature of the second embodiment of the present invention which is embodied by constituting elements 119 to 124 will be described. The signals 110a to 113a supplied to the fifth switching circuit 119 are selected by a four-phase selection signal 125a supplied from the servo control system 125 to produce a fifth reproduced signal 119a shown in FIG. 10(J), which contains the signals 110a to 113a in equal periods. The selection signal 125a has a frequency twice that of the first drum pulse 114b as shown in FIGS. 10 (F) and 10(G) and is obtained by dividing a control signal by 4. The control signal is shown in FIG. 10(E) and has a leading edge concurring with that of the first drum pulse.

An amplitude level of the fifth reproduced signal 119a is detected by a rectifier circuit 120 and an integration circuit 121 as in the conventional manner and supplied to a constant current circuit 122 as a first amplitude level detection signal 121a. A signal which is obtained by converting the first amplitude level detection signal 121a being a voltage, into a current by the constant current circuit 122 is supplied to a hold circuit 123 composed of such as capacitor. An output signal 123a of the hold circuit 123 has a waveform shown in FIG. 10(K) and is reset by a reset signal 126a which is shown in FIG. 10(L) and is synchronized with a leading edge of the first drum pulse 114b. Prior to the resetting of the output signal 123a, the signal 123a is sampled by a sampling circuit 124 with a sampling signal 125b shown in FIG. 10(M) to obtain a second amplitude level detection signal 124a which is a sum of amplitude levels of the reproduced signals related to all of the magnetic heads. The servo control system 125 controls a running of the magnetic tape T as such that the second amplitude level detection signal 124a becomes maximum.

[THIRD EMBODIMENT]

Figure 11:
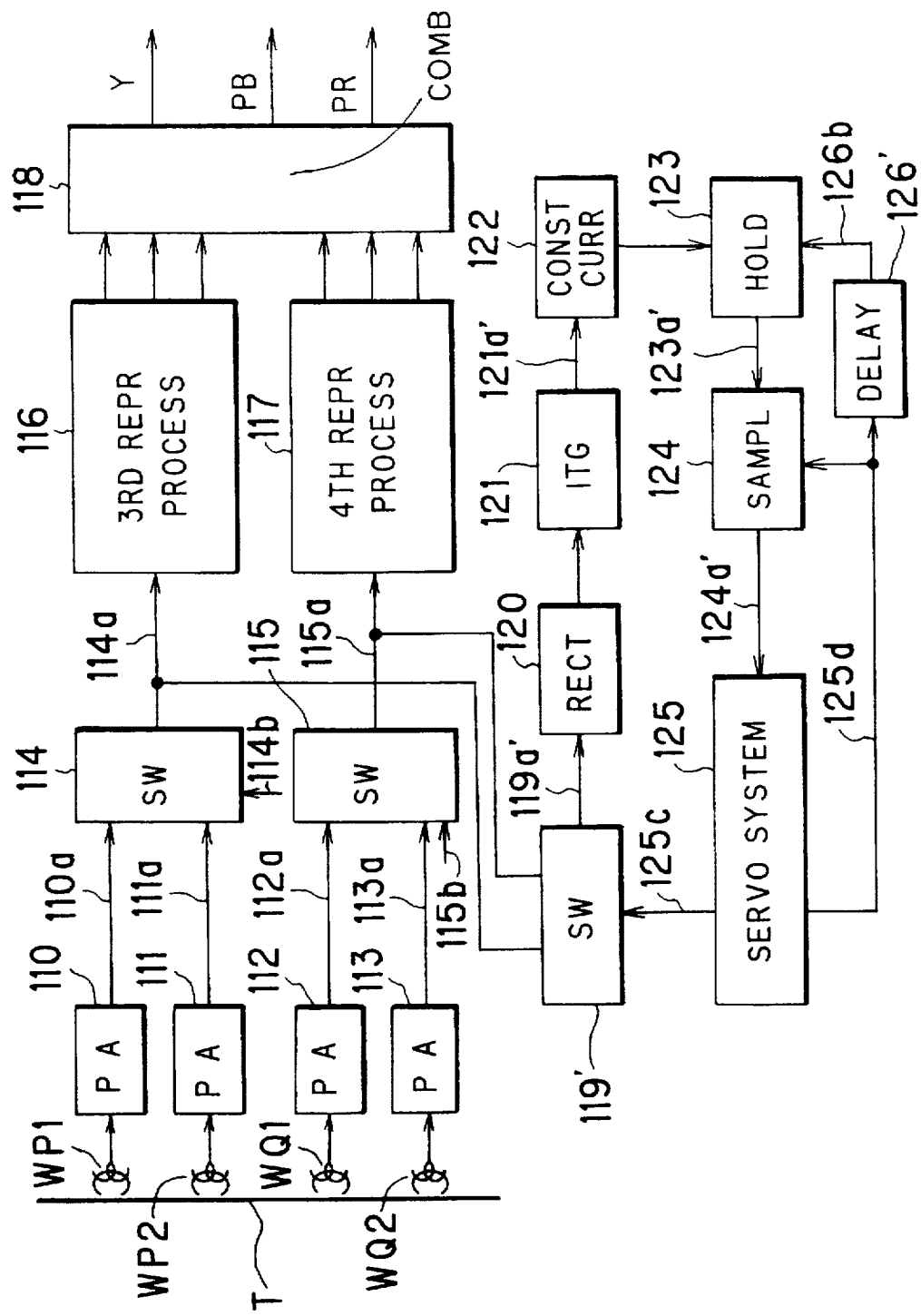
FIG. 11 is a block diagram of a third embodiment of the signal reproducing apparatus according to the present invention.

FIG. 11 is a block diagram of a third embodiment of the signal reproducing apparatus according to the present invention and FIG. 12(A) to 12(G) are a timing chart of the third embodiment shown in FIG. 11. In the previous second embodiment, in order to average information from the respective magnetic heads, the second amplitude level detection signal 124a is obtained by switching the output signals 110a to 113a of the preamplifiers 110 to 113 by the fifth switching circuit 119 and adding the amplitude levels of the reproduced signals related to all of the magnetic heads every frame. Since, however, a response frequency of several Hz for the auto-tracking system is sufficient while the selection signal 125a is the 4-phase signal as shown in FIGS. 10 (F) to 10 (I), a construction to obtain such parameters becomes complicated. In the third embodiment, this problem is solved by producing the second amplitude level detection signal 124a' every 2 frames.

Describing this with reference to FIGS. 11 and 12, FIG. 11 differs from FIG. 9 in that the third and fourth reproduced signals 114a and 115a are used as input signals to the fifth switching circuit 119+, that a selection signal 125c is used instead of the 4-phase selection signal 125a and that a sampling signal 125d having a period of 2 frames and a reset signal 126b are used.

Figure 12A:
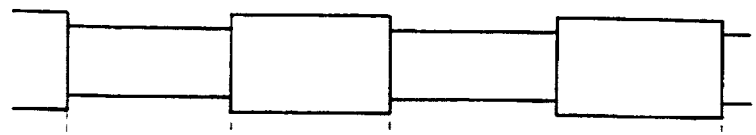
FIGS. 12(A) to 12(G) show a timing chart of operation of the signal reproducing apparatus shown in FIG. 11.
Figure 12B:
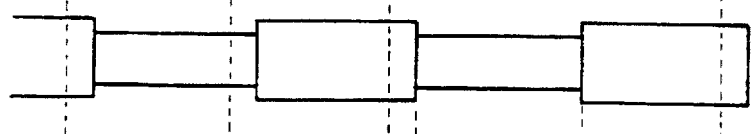
Figure 12C:
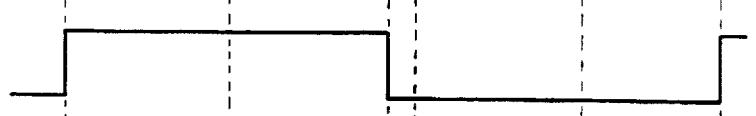
Figure 12D:

That is, the third and fourth reproduced signals 114a and 115a shown in FIGS. 12(A) and 12(B) are selected alternatively every frame of the selection signal 125c shown in FIG. 12(C) by the fifth switching circuit 119', resulting in a fifth reproduced signal 119a' shown in FIG. 12(D). The selection signal 125c is obtained by dividing the frequency of the first drum pulse 114b (FIG. 10(A)) by 2.

Figure 12E:
Figure 12F:
Figure 12G:
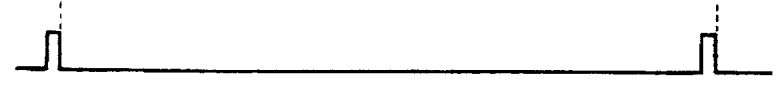

The fifth reproduced signal 119a' is passed through constituting components 120 to 123 as in the second embodiment to obtain an output signal 123a' shown in FIG. 12(E) from a hold circuit 123. This signal 123a' is produced in a high level period of the reset signal 126b shown in FIG. 12 (F) and sampled with the sampling signal 125d shown in FIG. 12(G), resulting in the second amplitude level detection signal 124a'. A servo control circuit 125 controls a running of the magnetic tape T as such that the signal 124a' becomes maximum. Thus, it is possible to appropriately perform the tracking servo control for the first and second reproduced signals.

In the second and third embodiments, although the fifth switching circuit 119, 119' sequentially select the input signal every frame or every two frames, the present invention is not limited thereto so long as the input signal is sequentially selected in a predetermined period.

Further, in the second and third embodiments, the amplitude level of the fifth reproduced signal 119a, 119a' is detected through the rectifier circuit 120 and the integration circuit 121, but the present invention is not limited thereto and can use any other amplitude level detection circuit.

In the second and third embodiments, the amplitude level related to the fifth reproduced signal 119a, 119a' is integrated by using the constant current circuit 122, the hold circuit 123 and the sampling circuit 124. However, the present invention can use any other level integration circuit which integrates the amplitude level related to the fifth reproduced signal 119a, 119a' for a predetermined time period.

Figure 15:
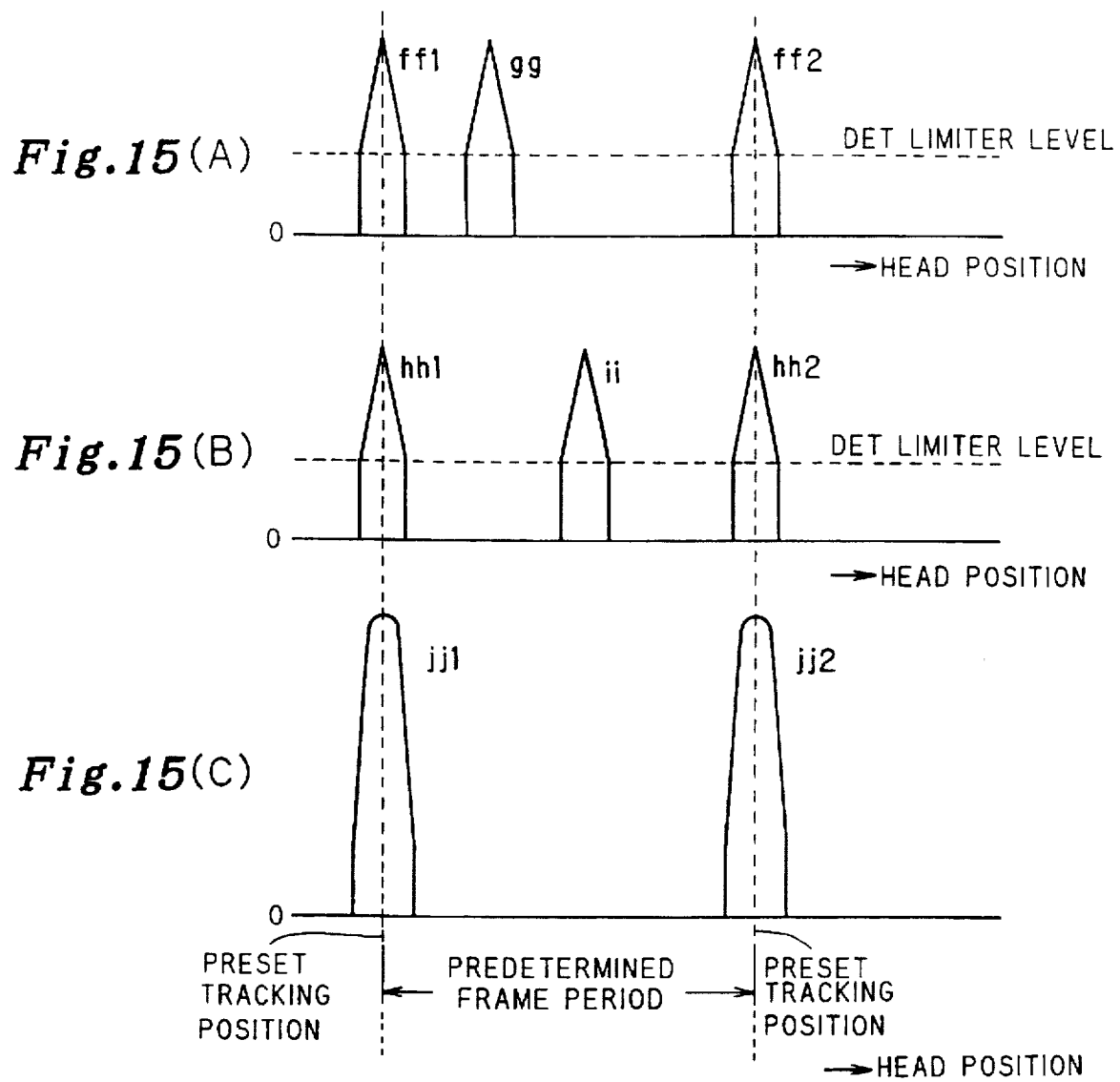
FIGS. 15(A) to 15(C) show a reproducing operation of the signal reproducing apparatus of the fourth embodiment of the present invention.

FIGS. 13(A) to 13(D) show a reproducing operation of the signal reproducing apparatus according to the present invention. FIGS. 15(A) to 15(C) show a reproducing operation of the signal reproducing apparatus according to the fourth embodiment of the present invention. FIGS. 17(A) to 17(D) show a reproducing operation of the signal reproducing apparatus according to the fifth embodiment of the present invention, and FIG. 18 is a flowchart of an operation circuit of the fifth embodiment of the present invention.

In the first embodiment, the multiplying circuit has been described for unifying the first and second amplitude level detection signals related to the respective first and second reproduced signals to obtain the steep third amplitude level detection signal 23a. However, in a case where mounting error of magnetic heads related to the first and second reproduced signals is within a predetermined range and peak positions of these reproduced signals are coincident when tracking amount is changed, it is of course possible to use an adder circuit which can be realized with a small modification of the multiplying circuit instead of the latter.

|FOURTH EMBODIMENT|

In the first embodiment, the maximum value of the product of the plurality of the amplitude level detection signals 20a and 22a is obtained in the multiplying circuit 23 which multiplies the output signals of the amplitude level detection circuits constituted with the rectifier circuit 19 and the integration circuit 20 and the amplitude level detection circuit constituted with the rectifier circuit 21 and the integration circuit 22. "Y" is obtained through the steps S1 to S8, "X" is obtained through the steps S9 to S15 and the final tracking control signal is determined from the average of X and Y. In such method of obtaining the tracking control signal, however, the running of the magnetic tape T becomes irregular temporarily when, for example, the mode is switched from a high speed reproduction mode to a normal reproduction mode. This causes scanning positions of the magnetic heads to be deviated from normal recording tracks to be scanned. When the magnetic heads scan recording tracks having azimuth angles which are similar but not identical to that of the normal recording tracks under this condition, signals having large amplitudes as those obtainable from scanning of the normal recording tracks are reproduced. Since the capstan servo control is performed by a pseudo tracking control signal produced on the basis of such large amplitude reproduced signals, recovery to the capstan servo control according to the normal tracking control signal may become quite difficult.

Figure 13A:
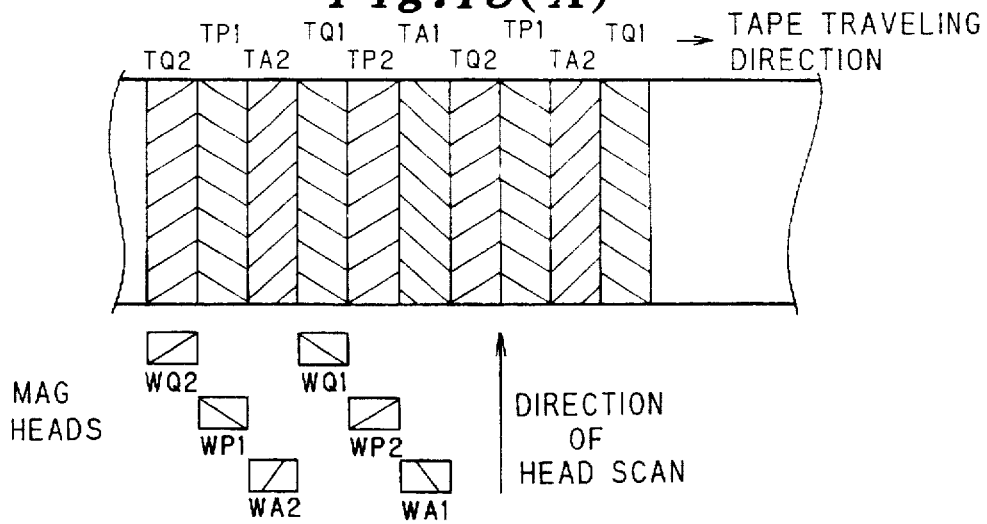
FIGS. 13(A) to 13(D) show a reproducing operation of the signal reproducing apparatus according to the present invention.
Figure 13B:
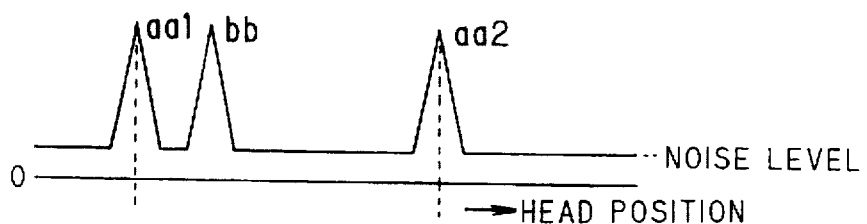

Describing this in more detail, magnetic heads WQ1, WQ2, WP1 and WP2 scan recording tracks TQ1, TQ2, TP1 and TP2 which are recorded with the same azimuth angles as that of the magnetic heads WQ1, WQ2, WP1 and WP2 during a predetermined frame period (for example, one frame period) as shown in FIG. 13(A) (although the recording track pattern (TQ2, TP1, TA2, TQ1, TP2, TA1, TQ2 . . . ) formed on the magnetic tape T is shown perpendicular to the tape running direction in FIG. 13(A) for convenience of explanation, it is slanted thereto practically). Waveform of the amplitude level detection signal 22a obtained from the magnetic heads WQ1 and WQ2 scanning the magnetic tape T under this condition is shown in FIG. 13(B) in which a large output signal waveforms (containing only waveforms aa1 and aa2) obtained when the magnetic head WQ1 (or WQ2) traces normally the recording track TQ1 (or TQ2) having the same azimuth angle and a large output signal waveform (waveform containing only waveform bb, obtained by the so-called similar azimuth reproduction) obtained when the magnetic head WQ1 (or WQ2) erroneously traces the recording track TP1 (or TP2) having a similar but not identical azimuth angle, are shown overlapped in FIG. 13 (B). When the magnetic heads WQ1 and WQ2 scan the recording tracks TQ1 and TQ2 having the same azimuth angles on the magnetic tape T, the level of the amplitude level detection signal becomes maximum, resulting in the signal waveforms aa1 and aa2 shown in FIG. 13(B). The scanning positions of the magnetic heads WQ1 and WQ2 are referred to as preset tracking positions and the amplitude level detection signal reduces as the scanning positions of the magnetic heads WQ1 and WQ2 deviate from the preset tracking positions in the running direction of the magnetic tape T (that is, in FIG. 13(A), when the magnetic heads WQ1 and WQ2 are deviated largely toward the magnetic tracks TQ1 and TQ2). Only when the magnetic heads WQ1 and WQ2 scan the recording tracks TP1 and TP2 recorded at similar azimuth angles to that of the magnetic heads WQ1 and WQ2, the amplitude level detection signal waveform bb having a similar level as that of the signal waveforms aa1 and aa2 is outputted at that position.

Figure 13C:
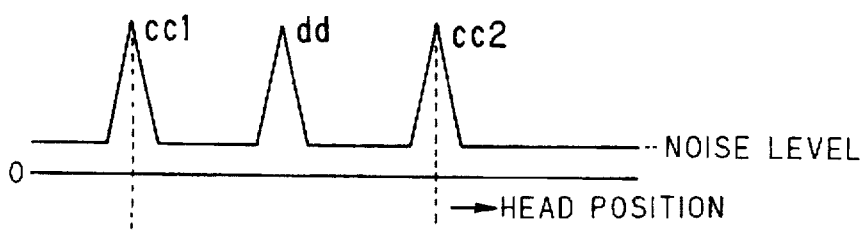

Similarly, a waveform of the amplitude level detection signal 20a obtained from the magnetic heads WP1 and WP2 scanning the magnetic tape T is shown in FIG. 13(C) in which large output signal waveforms (containing only waveforms cc1 and cc2) obtained when the magnetic head WP1 (or WP2) traces normally the recording track TP1 (or TP2) having the same azimuth angle and a large output signal waveform (waveform containing only waveform dd, obtained by the so-called similar azimuth reproduction) obtained when the magnetic head WP1 (or WP2) erroneously traces the recording track TQ1 (or TQ2) having a similar but not identical azimuth angle, are shown overlapped in FIG. 13(C). When the magnetic heads WP1 and WP2 scan the recording tracks TP1 and TP2 having the same azimuth angles on the magnetic tape T, the level of the amplitude level detection signal becomes maximum, resulting in the signal waveforms cc1 and cc2 shown in FIG. 13(C). The scanning positions of the magnetic heads WP1 and WP2 are referred to as preset tracking positions and the amplitude level detection signal is reduced from the scanning positions of the magnetic heads WP1 and WP2 with deviation of the scanning positions of the magnetic heads WP1 and WP2 from the preset tracking positions in the running direction of the magnetic tape T (that is, in FIG. 13(A), when the magnetic heads WP1 and WP2 are deviated largely toward the magnetic tracks TA2 and TA1). Only when the magnetic heads WP1 and WP2 scan the recording tracks TQ1 and TQ2 recorded at similar azimuth angles to that of the magnetic heads WP1 and WP2, the amplitude level detection signal waveform dd having a similar level as that of the signal waveforms cc1 and cc2 is outputted at that position.

Figure 13D:
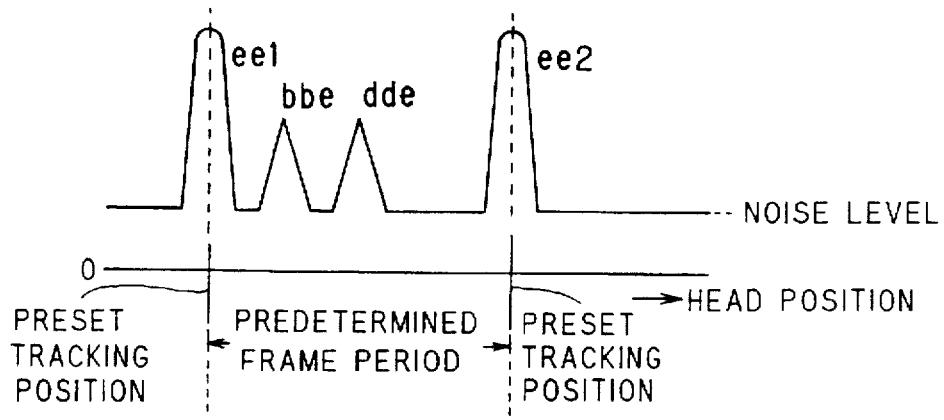

Amplitude level detection signal waveforms ee1, dde and bbe shown in FIG. 13(D) are obtained by multiplying the amplitude level detection signal waveforms aa1 and bb and the amplitude level detection signal waveforms cc1 and dd within a predetermined frame period shown in FIGS. 13(B) and 13(C) by the multiplying circuit 23.

There is a constant noise included in the respective waveforms shown in FIGS. 13(B) and 13(C) and noise level is increased as a result of multiplication of these signals as shown in FIG. 13(D). In some case, there may be the signal waveforms dde and bbe having similar level to that of the amplitude level detection signal waveform ee1.

The result of the multiplication containing the high level noise shown in FIG. 13(D) is supplied to the operation circuit 24 as the third amplitude level detection signal 23a. In FIG. 13(D), waveforms obtained by the multiplying circuit 23 are shown at all positions of the magnetic heads within the predetermined frame period. Practically, however, only the amplitude level detection signal waveform ee1 is supplied to the operation circuit 24 as the output signal waveform resulting from the multiplication when the magnetic heads WQ1, WQ2, WP1 and WP2 scan the normal recording tracks TP1, TP2, TQ1 and TQ2 and the amplitude level detection signal waveform including the large waveforms dde and bbe is supplied to the operation circuit 24 as the output signal waveform resulting from the multiplication when the magnetic heads WQ1, WQ2, WP1 and WP2 scan the recording tracks TP1, TP2, TQ1 and TQ2 having azimuth angles which are not normal but similar to normal conditions. As shown in FIG. 13(D), all of the amplitude level detection signal waveforms ee1, dde, bbe and ee2 are imposed with a constant noise level, so that the levels of the respective detection signals are raised by the noise level apparently. Therefore, when the amplitude level detection signal waveforms dde and bbe are supplied to the operation circuit 24 which operates to obtain "Y" through the steps S1 to S8, "X" through the steps S9 to S15 and to determine the final tracking control signal by the average of the Y and X, the noise level is included as a portion of the amplitude level detection signal waveform and, therefore, there may be a continuous error operation that the magnetic heads scan recording tracks which are deviated from the preset tracking positions and have similar azimuth angles, while their positions are fixed on the recording tracks.

Figure 14:
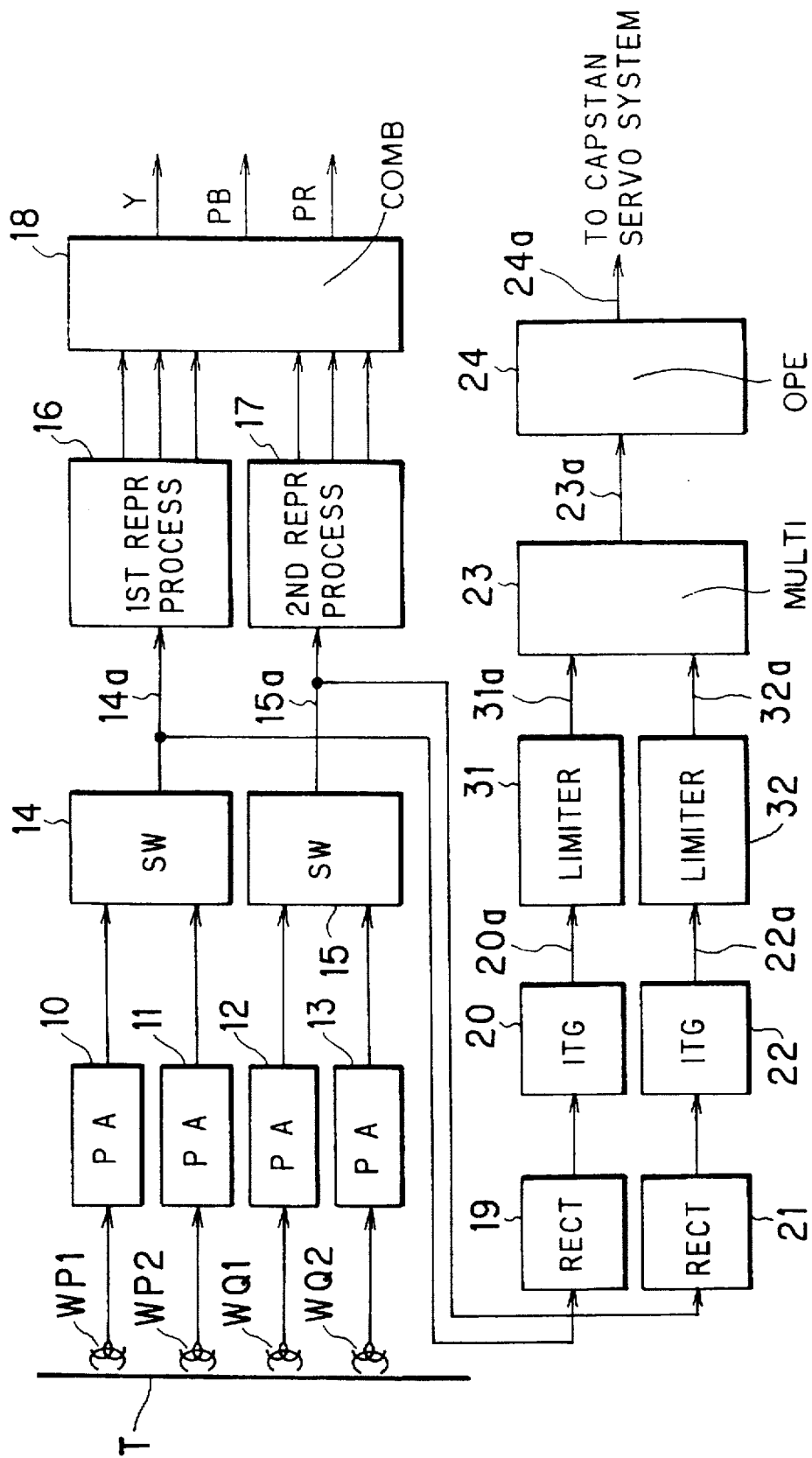
FIG. 14 is a block diagram of a fourth embodiment of the signal reproducing apparatus according to the present invention.

The fourth embodiment of the present invention solves this problem. FIG. 14 is a block diagram of a fourth embodiment of the signal reproducing apparatus according to the present invention. The fourth embodiment is featured by provision of two level limiter circuits 31 and 32 between the integration circuits 20 and 22 and the multiplying circuits 23 of the first embodiment respectively, as shown in FIG. 14. The first and second amplitude level detection signals 20a and 22a from the integration circuits 20 and 22 are supplied to the level limiter circuits 31 and 32 respectively. Each level limiter circuit determines the amplitude level detection signal input thereto as "0" level when the level of the input amplitude level detection signal is not higher than a predetermined level (that is, the detection limiter level at which the noise can be completely removed). Thus, the level limiter circuits 31 and 32 output signals 31a and 32a containing no noise as a first and second limiter amplitude level detection signals to the multiplying circuit 23. Switches (not shown) which constitute, together with comparators (also not shown), the level limiter circuits 31 and 32 pass the amplitude level detection signals 20a and 22a whose magnitudes are equal to or larger than a predetermined level and cut the amplitude level detection signals whose levels are lower than the predetermined level. Thus, the amplitude level detection signal waveforms aa1 and bb and the amplitude level detection signal waveforms cc1 and dd outputted from the integration circuits 20 and 22, which are shown in FIGS. 13(B) and 13(C) and have noise level added, are level-limited by the level limiter circuits 31 and 32 to remove the noise level as shown in FIGS. 15(A) and 15(B), resulting in amplitude level detection signal waveforms ff1 and gg and waveforms hh1 and ii. These amplitude detection signals outputted from the level limiter circuits 31 and 32 and having levels equal to or higher than the predetermined level, are supplied to the multiplying circuit 23 as the first and second limiter amplitude level detection signals 31a and 32a.

The third amplitude level detection signal jj1 from the multiplying circuit 23 is supplied to the operation circuit 24. Therefore, it is possible to determine only the amplitude level detection signals ff1 and hh1 regardless of noise level to thereby determine the normal preset tracking position in the operation circuit 24 of the first embodiment. Thus, the problem in the first embodiment is removed.

[FIFTH EMBODIMENT]

Although, in the first and fourth embodiments, the case where the first reproduced signal and the second reproduced signal related to the TCI signal of the video signal are reproduced simultaneously by using the magnetic heads WP1, WP2, WQ1 and WQ2, has been described. It is of course possible to simultaneously reproduce more than two signals including the TCI signal and the audio signal by using the magnetic heads WP1, WP2, WQ1, WQ2, WA1 and WA2. In this case, amplitude levels of all of the reproducing signals are obtained, which are unified by multiplying or adding them to obtain a third amplitude level detection signal on which a tracking servo control is performed, as will be described later. Further, when there is a difference in significance between three or more reproducing signals, it is possible to perform a tracking servo control by using a third amplitude level detection signal obtained by unifying amplitude level detection signals of two or more of these reproduced signals.

Further in the fourth embodiment, although the problem of the pseudo azimuth reproduction which occurs during amplitude level processing of the first and second reproduced signals (the first kind of reproduced signals 14a and 15a) related to the TCI signal is considered, it is possible to perform a capstan servo control more precisely by using an amplitude level of an audio signal (third reproduced signal) which is reproduced together with the first and second reproduced signals which are video signals, as will be described later.

Figure 16:
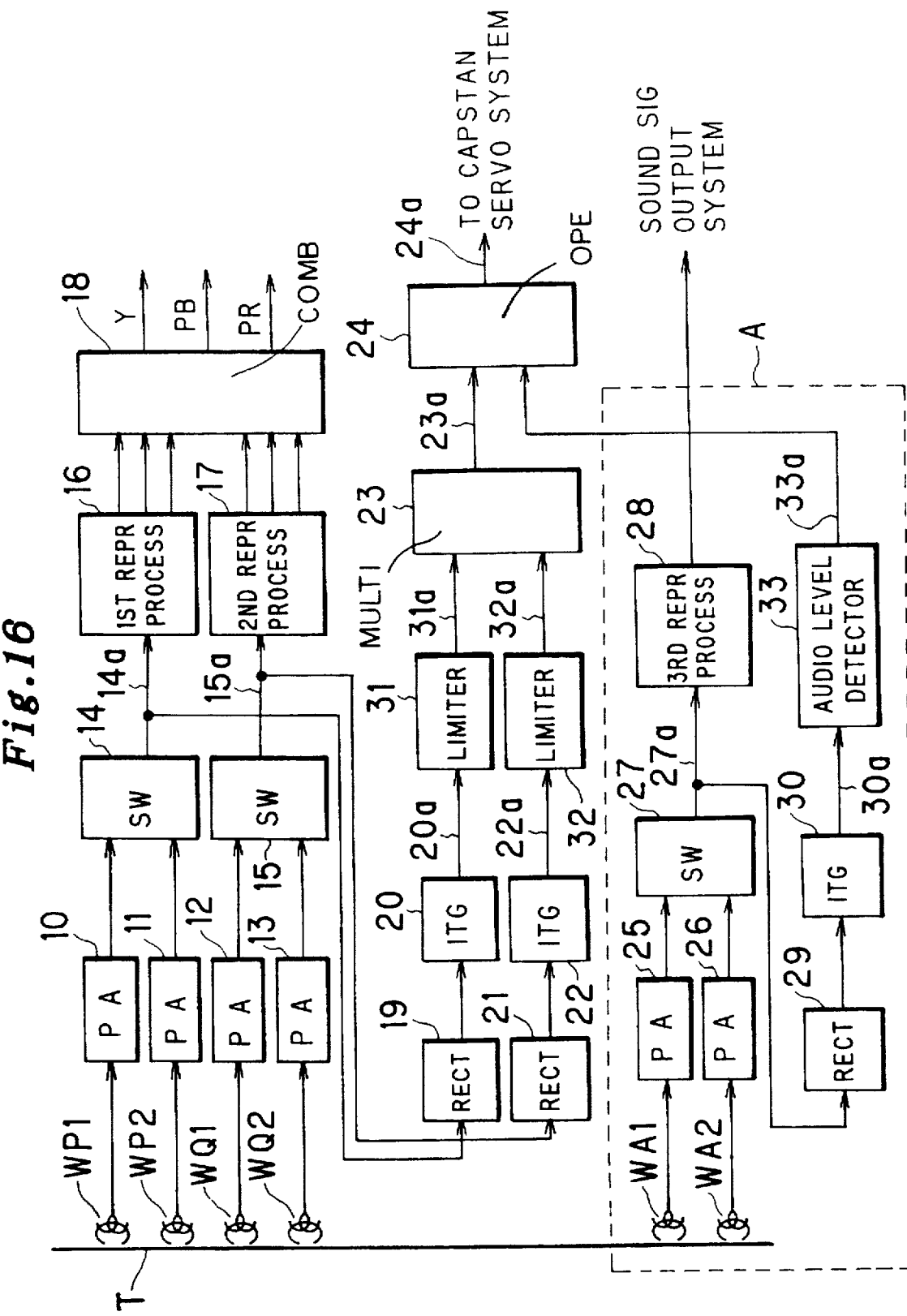
FIG. 16 is a block diagram of a fifth embodiment of the signal reproducing apparatus according to the present invention.

FIG. 16 is a block diagram of a fifth embodiment of the signal reproducing apparatus according to the present invention. In FIG. 16, a capital letter "A" indicates a signal processing system of the third reproduced signal which is an audio signal. In the signal processing system A, output signals reproduced from a magnetic tape T through magnetic heads WA1 and WA2 are amplified by preamplifiers 25 and 26 as audio signals of 2 channels, then unified by a third switching circuit 27 as the third reproduced signal 27a, which is converted into a fourth amplitude level detection signal 30a going through a rectifier circuit 29 and an integration circuit 30. The fourth amplitude level detection signal 30a is supplied to an audio amplitude level detection circuit 33 (detection signal generator circuit). The output signal 27a from the third switching circuit 27 is supplied to a third reproduction processing circuit 28, in which the signal 27a is filtered by a band-pass filter (not shown) and FM-demodulated by a demodulator (not shown), then signal-processed in a predetermined manner, thus processed audio signal by the third reproduction processing circuit 28, is supplied to a sound signal output system which is not shown. The audio signal from the third reproduced signal processing circuit 28 in FIG. 16 supplied to the sound signal output system is practically audio signals of 2 channels whose frequencies are separated each other. The circuit construction from the magnetic heads WP1, WP2, WQ1 and WQ2 to the operation circuit 24 is the same as that shown in FIG. 14 and same components are indicated by the same reference numerals respectively. Therefore, description thereof is omitted.

Figure 17:
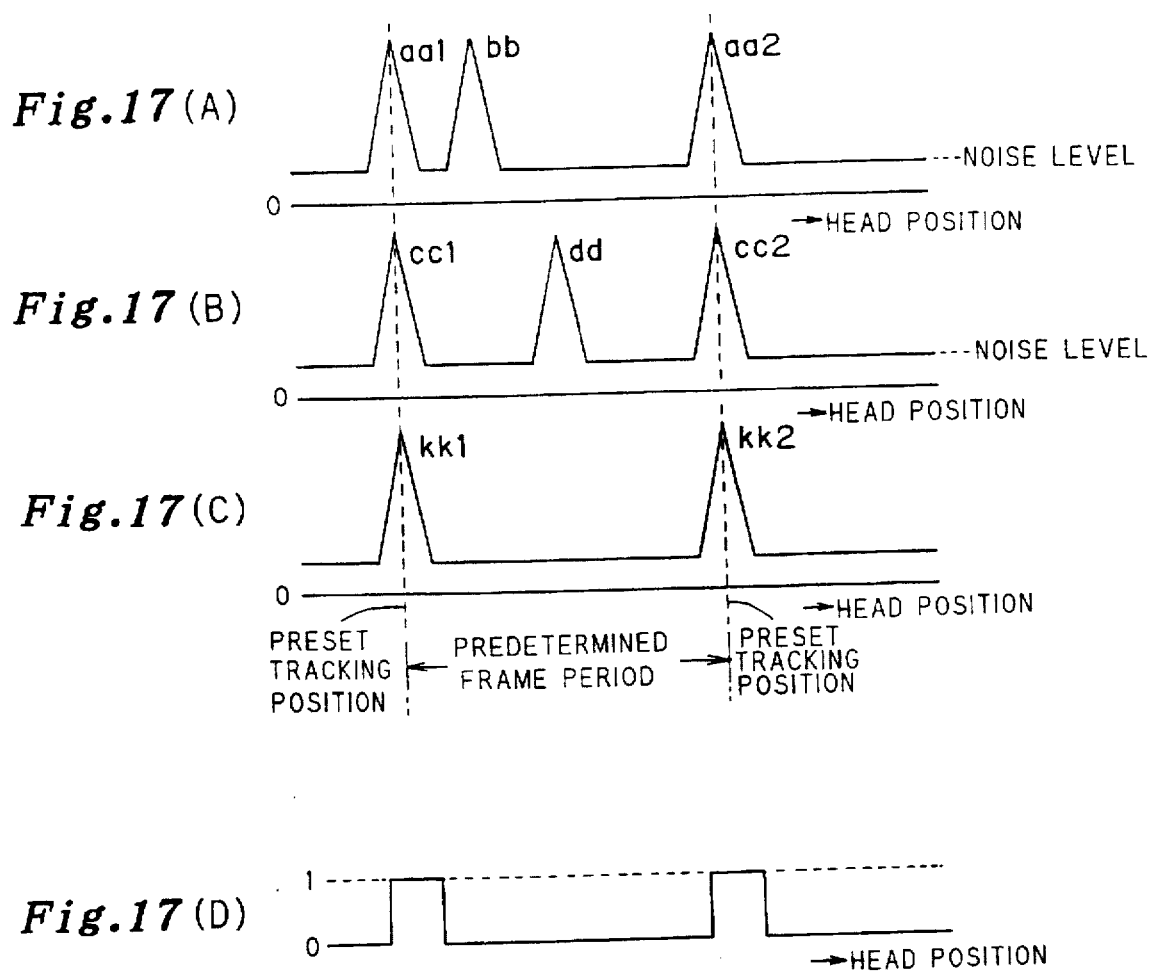
FIGS. 17(A) to 17(D) show a reproducing operation of the signal reproducing apparatus according to the fifth embodiment of the present invention.
Figure 18:
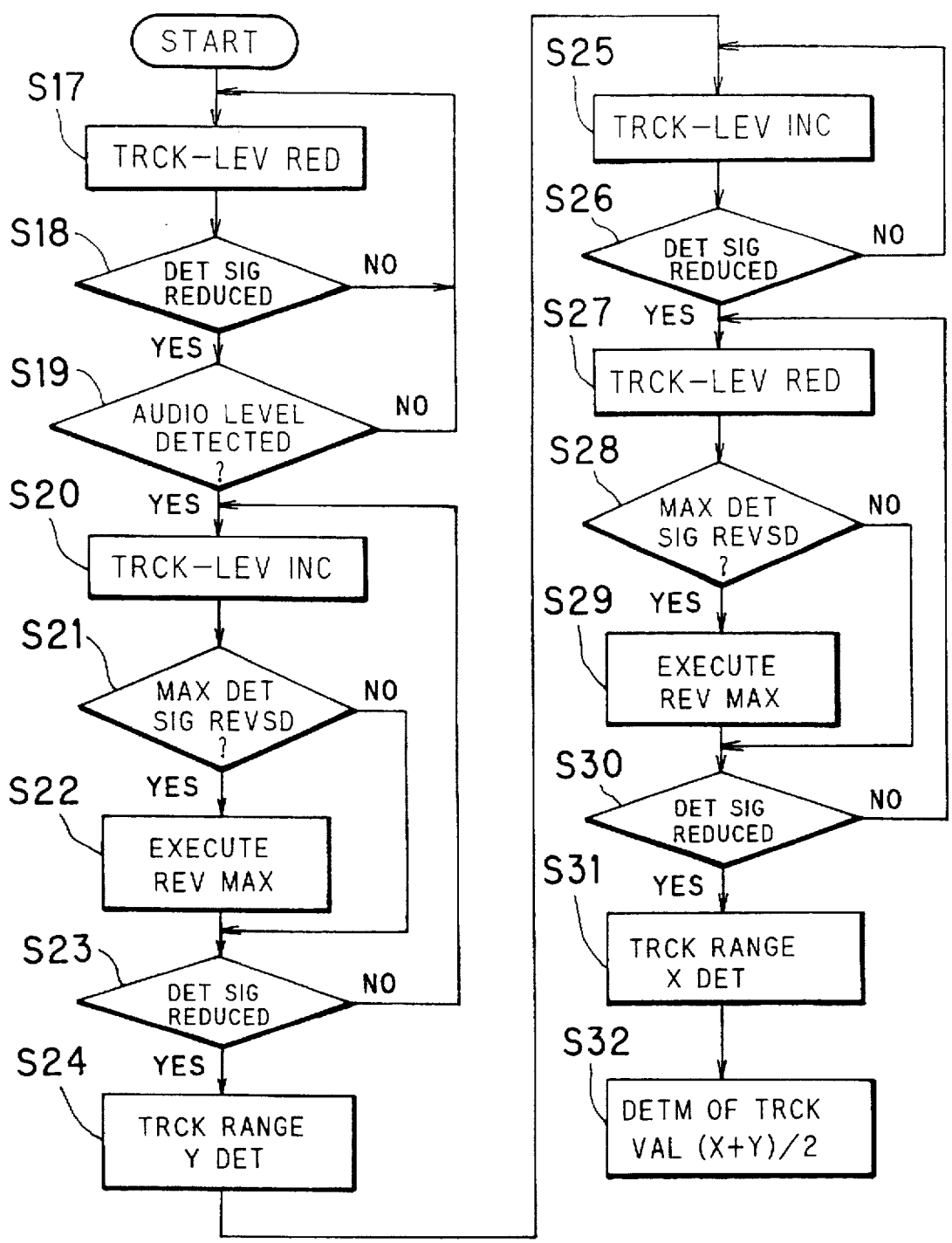
FIG. 18 is a flowchart of an operation circuit of the fifth embodiment of the present invention.

FIGS. 17(A) and 17(B) show the plurality of amplitude level detection signals 20a and 22a respectively and FIG. 17 (C) shows the fourth amplitude level detection signal 30a obtained by the rectifier circuit 29 and the integration circuit 30 in the signal processing system A of the third reproduced signal. Since, when the magnetic heads WA1 and WA2 scan sequentially the recording tracks TP1, TP2, TQ1 and TQ2 in a predetermined frame period, recorded signals related to these tracks are higher in frequency than the recorded signals related to the recording tracks TA1 and TA2, the recorded signals related to the tracks TP1, TP2, TQ1 and TQ2 are not pseudo azimuth reproduced. This is because the fourth amplitude level detection signal 30a is obtained from the audio signals reproduced from the recording tracks TA1 and TA2 and the audio signals include only signals obtained by scanning the recording tracks TA1 and TA2 on which the audio signals are recorded with azimuth angles corresponding to the magnetic heads WA1 and WA2 in this frame period.

The fourth amplitude level detection signal 30a is supplied to the audio amplitude level detection circuit 33 which outputs a detection signal 33a |FIG. 17(D)| which is supplied to the operation circuit 24. The detection signal 33a is obtained from the fourth amplitude detection signal 30a and is a binary gate signal having a value "1" corresponding to a portion of the fourth amplitude level detection signal 30a equal to or higher than a predetermined threshold level and a value "0" of the same corresponds to a portion thereof lower than the threshold level. The predetermined threshold level is set in a threshold circuit (not shown) constituting the audio amplitude level detection circuit 33. Therefore, the third amplitude level detection signal 23a supplied to the operation circuit 24 is processed therein only when the gate signal 33a is in the status "1".

That is, in the operation circuit 24 to which the gate signal 33a is supplied, the final tracking control signal is determined according to the flowchart shown in FIG. 18. In FIG. 18, processings performed in the step S17 and the step S18 after started are the same as those performed in the steps S2 and S3 of the flowchart shown in FIG. 8. That is, the tracking signal 24a is reduced and the audio amplitude level detection circuit 33 detects presence or absence of the fourth amplitude level detection signal 30a at a time when the tracking signal reaches a predetermined value. If there is no fourth amplitude level detection signal 30a detected, the operation is returned to the step S17 and, if it is detected, the steps subsequent to the step S24 are performed.

When the detection signal 33a is supplied to the operation circuit 24 together with the third amplitude level detection signal 23a obtained by multiplying the output signals 31a and 32a from the level limiter circuits 31 and 32 by the multiplying circuit 23, it can be judged that the third amplitude level detection signal at a position in which the detection signal 33a is obtained is obtained from magnetic heads scanning predetermined recording tracks in a predetermined frame period. Therefore, it is possible to obtain a highly precise tracking control signal from the operation circuit 24.

Although not described in detail, it is possible to determine the third amplitude level detection signal 23a being resulted from scanning of normal recording tracks, by supplying the third amplitude level detection signal 23a to the operation circuit 24 in the first embodiment and supplying the detection signal 33a obtained in the signal processing system A for the third reproduced signal to the operation circuit 24 in the fifth embodiment. Therefore, it is possible to obtain a highly precise tracking control signal from the operation circuit 24 without using the level limiter circuits 31 and 32.

In the first to fifth embodiments, although a magnetic tape is used as the recording medium, the present invention which performs an appropriate tracking servo control by unifying reproducing signals in a plurality of channels is not limited to such magnetic tape and applicable to other recording mediums such as optical disc, magneto-optical disc or magnetic disc.

In the first to fifth embodiments, a video signal is used as the signal reproduced from the recording medium. However, this invention is not limited to a specific signal and is also applicable to a mere signal such as an audio signal or an information signal since the present invention performs an appropriate tracking servo control by unifying reproducing signals in a plurality of channels.

|SIXTH AND SEVENTH EMBODIMENTS|

Figure 19:
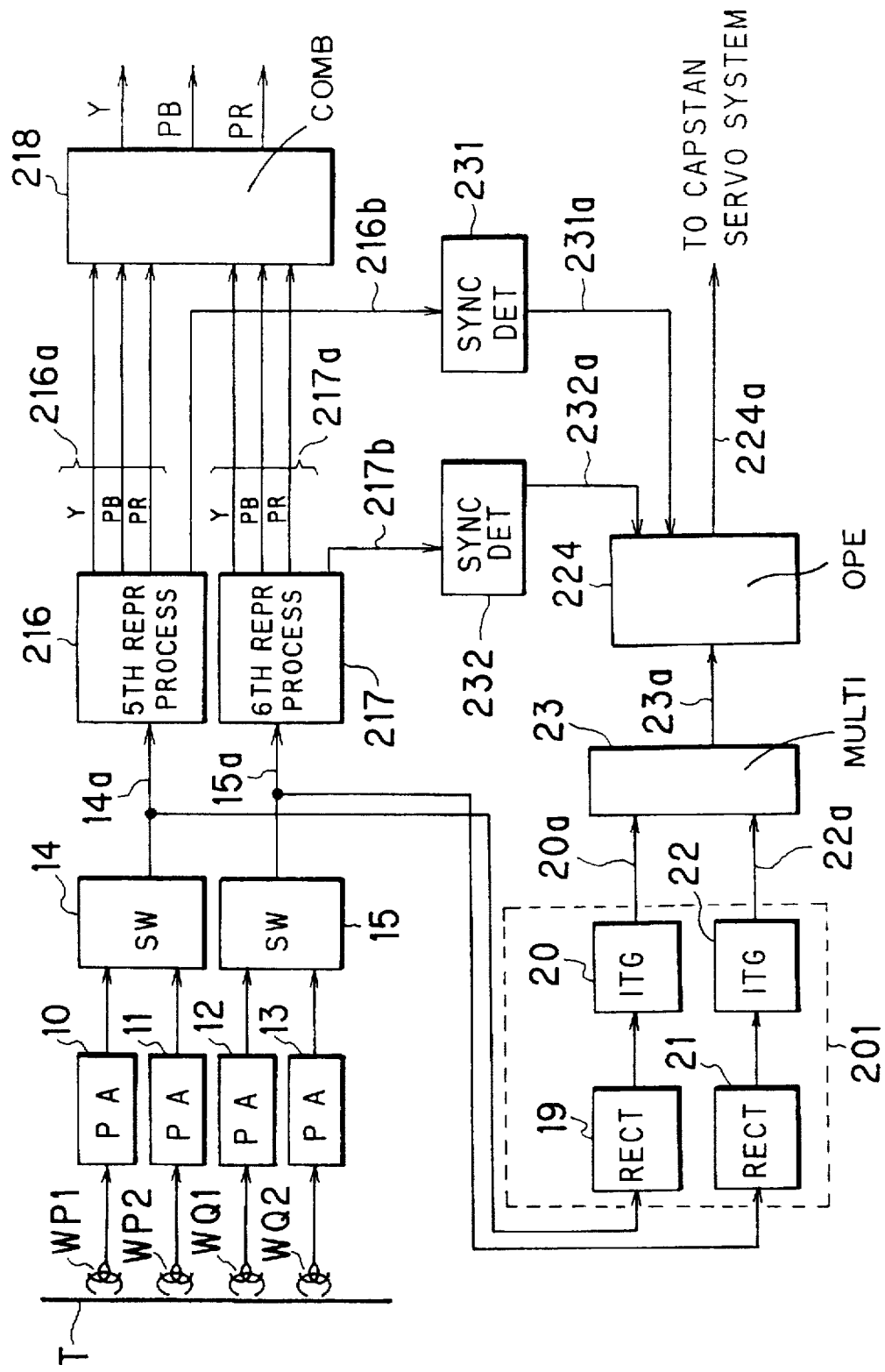
FIG. 19 is a block diagram of a sixth embodiment of the signal reproducing apparatus according to the present invention.
Figure 23:
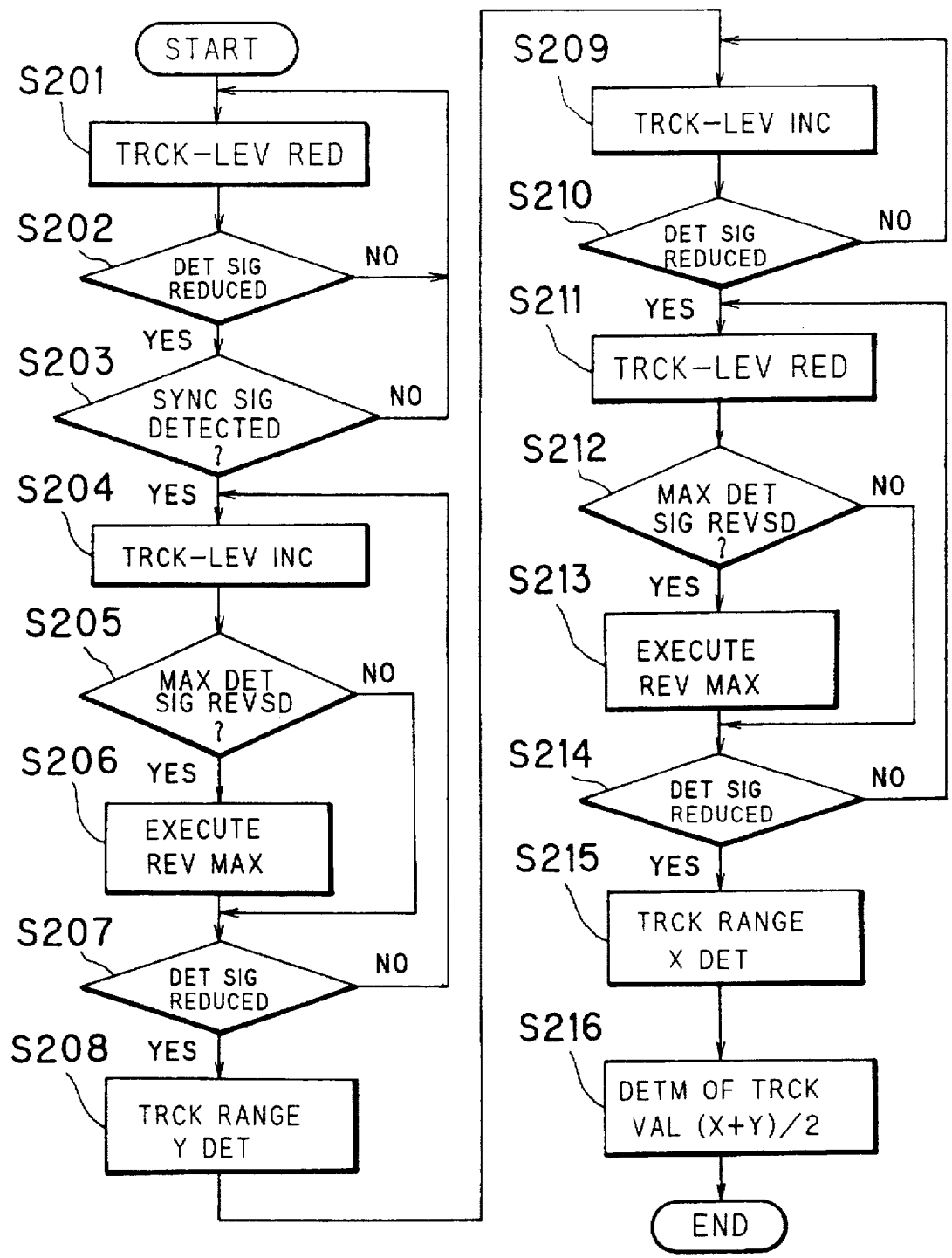
FIG. 23 is a flowchart showing an operation of the operation circuit of the sixth embodiment of the present invention.
Figure 25:
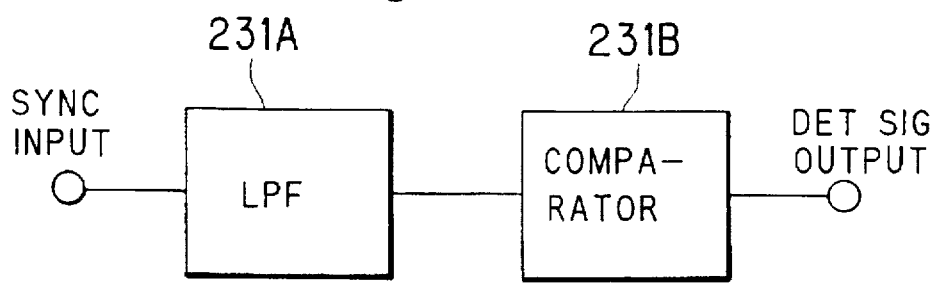
Figure 26A:
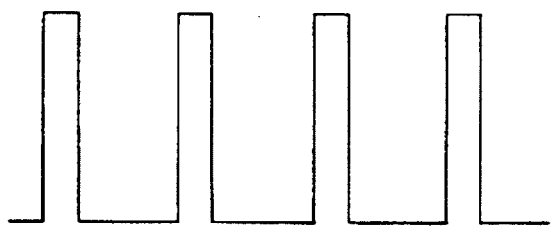
FIGS. 26(A) to 26(C) are waveforms useful in understanding the operation of the synchronizing signal detection circuit shown in FIG. 25.
Figure 26B:
Figure 26C:
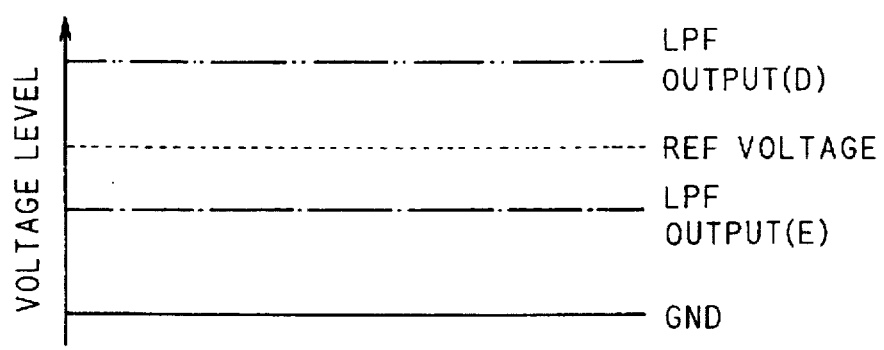
Figure 30:
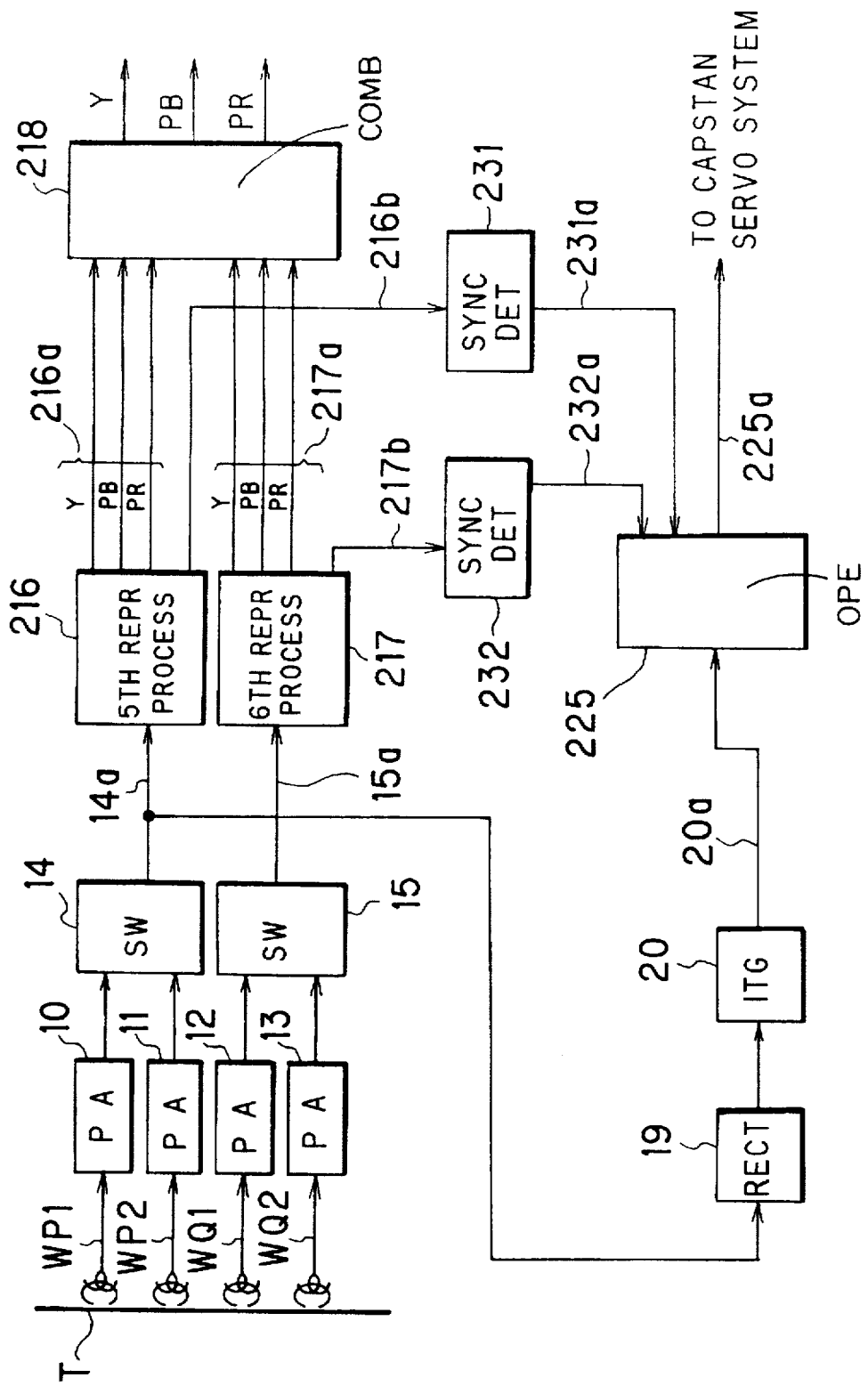
FIG. 30 is a block diagram of a seventh embodiment of the signal reproducing apparatus according to the present invention.

Now, sixth and seventh embodiments of the present invention will be described with reference to FIGS. 19 to 30, in which FIG. 19 is a block diagram of the sixth embodiment of the signal reproducing apparatus according to the present invention. FIG. 20 is a graph showing a relationship between an amplitude level detection signal and a tracking control signal. FIG. 21 is a graph showing an operation of the operation circuit. FIG. 22 is a graph showing an operation of the operation circuit. FIG. 23 is a flowchart showing an operation of the operation circuit. FIGS. 24(A) to 24(E) are waveforms useful in understanding the operation of the operation circuit. FIGS. 25, 27 and 28 are exemplary block diagrams of synchronizing signal detection circuits respectively. FIGS. 26(A) to 26(C) are waveforms useful in understanding the operation of the synchronizing signal detection circuits shown in FIG. 19. FIGS. 29(A) to 29(C) are waveforms useful in understanding the operation of the synchronizing signal detection circuit shown in FIG. 28 and FIG. 30 is a block diagram of a seventh embodiment of the signal reproducing apparatus according to the present invention. In these figures, same components are depicted by same reference numerals, respectively.

A signal reproducing apparatus according to the sixth and seventh embodiments of the present invention comprises an amplitude level detection circuit 201 for detecting an amplitude level of at least one of a plurality of reproduced signals 14a and 15a reproduced from a recording medium (for example, magnetic tape T), synchronizing signal detection circuits 231 and 232 for detecting synchronizing signals 216b and 217b derived from the respective reproduced signals 14a and 15a and a control signal generator circuit (operation circuit) 224 for generating, on the basis of amplitude level detection signals 20a and 22a from the amplitude level detection circuit 201 and detection signals 231a and 232a from the synchronizing signal detection circuits 231 and 232, a control signal 224a for controlling head scanning for reproducing the signals 14a and 15a. The amplitude level detection circuit 201 is composed of the rectifier circuits 19 and 21 and the integration circuits 20 and 22.

The signal reproducing apparatus according to the present invention is capable of reproducing a high definition video signal such as HD (High Definition TV) signal as well as a conventional video signal such as NTSC signal. In the following description, the signal reproducing apparatus will be described with the HD signal and the NTSC signal. Although not described in detail, the present apparatus also includes a construction for reproducing an audio signal together with such HD signal and NTSC signal.

In the signal reproducing apparatus of the sixth embodiment of the present invention shown in FIG. 19, reproduced signals from a magnetic tape T having a tape pattern shown in FIG. 3 through magnetic heads WP1 and WP2 and magnetic heads WQ1 and WQ2 are amplified to a predetermined level by preamplifiers 10 to 13 and then supplied to a first and second switching circuits 14 and 15. The first and second switching circuits 14 and 15 respond to a drum pulse (frame period 30 Hz) and provide a first and second continuous reproduced signals 14a and 15a related to the magnetic heads WP1 and WP2 and the magnetic heads WQ1 and WQ2 and supply these reproduced signals to a fifth and sixth reproduction processing circuits 216 and 217 and the rectifier circuits 19 and 21.

The first and second reproduced signals 14a and 15a are those obtained by FM modulating a TCI signal which is obtained by time division multiplexing a compressed luminance signal (Y signal) and compressed line sequential color signals (PB and PR signals) and whose transmission is performed by sequentially and alternatively transmitting 2 TCI signals of Y+PB and Y+PR.

The fifth and sixth reproduction processing circuits 216 and 217 FM-demodulate these input signals to restore the TCI signal and expand the compressed luminance signals and the compressed line sequential color signals. The line sequential color signals are further demodulated in line sequence to obtain two sets of PB and PR signals. Thus, a first divided signal 216a including Y, PB and PR signals and a second divided signal 217a including Y, PB and PR signals are obtained. The first and second divided signals 216a and 217a are combined in a combining circuit 218 to obtain a group of Y, PB and PR signals which are transmitted to a transmission line such as known VTR video signal recording and reproducing system or a video display.

The fifth and sixth reproduction processing circuits 216 and 217 separate synchronizing signals from the reproduced signals 14a and 15a by means of a separator circuit which is not shown and supply the synchronizing signals 216b and 217b to the synchronizing signal detection circuits (SYNC detection circuits) 231 and 232. The detection signals (SYNC detection signals) 231a and 232a obtained in the SYNC detection circuits 231 and 232 through a signal processing to be described later are supplied to an operation circuit 224 to be described later.

The synchronizing signals are inserted into predetermined lines of the modulated (for example, frequency modulated) and transmitted HD signal or NTSC signal respectively, and used as a reference for demodulation and reproduction of the video signal from the modulated HD signal or NTSC signal and a phase control of signal to be reproduced is performed on the basis of this synchronizing signal. Therefore, the magnetic tape T is recorded by a recording apparatus which is not described in detail with the modulated video signal and the synchronizing signal as a control signal which is reproduced when the video signal is demodulated from the magnetic tape.

Figure 24A:
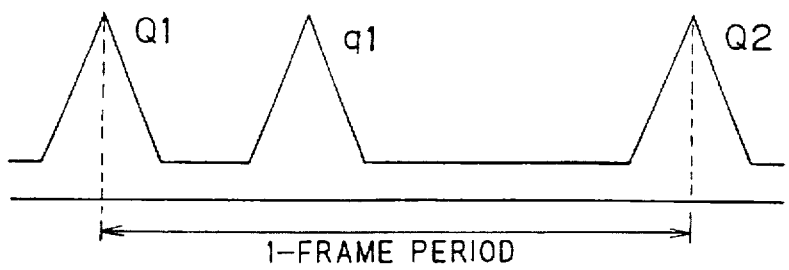
FIGS. 24(A) to 24(E) are waveforms useful in understanding the operation of the signal reproducing apparatus according to the sixth embodiment of the present invention.
Figure 24B:
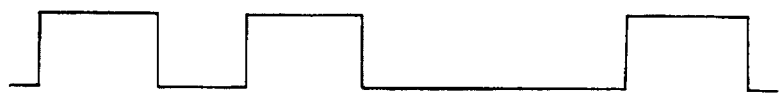
Figure 24C:
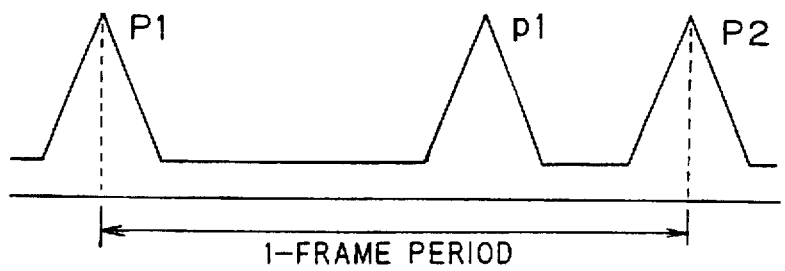

The first and second reproduced signals 14a and 15a are half-wave or full-wave rectified by the rectifier circuits 19 and 21 similarly to the conventional rectifier circuit 5 and then integrated in the integration circuits 20 and 22 to remove undesired high frequency components thereof, resulting in the first and second amplitude level detection signals 20a and 22a [shown in FIGS. 24(A) and 24(C) respectively]. The first and second amplitude level detection signals 20a and 22a are multiplied by the multiplying circuit 23 and a resultant signal 23a (shown in FIG. 24(E)) is supplied to the operation circuit 224.

FIG. 20 shows a relationship between the first and second amplitude level detection signals 20a and 22a and the tracking control signal. The inconsistency between "P" at which the first amplitude level detection signal 20a related to the first reproduced signal 14a becomes maximum and "Q" at which the second amplitude level detection signal 22a related to the second reproduced signal 15a becomes maximum, is due to a difference in relative height of the respective magnetic heads in the previously mentioned discrete recording and reproducing apparatuses. Thus, the tracking control signal 224a is at least required to have a value between the values "P" and "Q" in order to balance the first and second reproduced signals 14a and 15a. In view of this, the operation processing is performed on the basis of the output signal 23a obtained by multiplication of the first and second amplitude level detection signals 20a and 22a as the third amplitude level detection signal.

For example, the magnetic heads WP1 and WP2 precisely scan the predetermined recording tracks (tape pattern shown in FIG. 3) at the value "P" of the tracking control signal at which the first amplitude level detection signal related to the first reproduced signal 14a becomes maximum, to produce the first reproduced signal 14a. In this case, although the first reproduced signal 14a is obtained by the magnetic heads WP1 and WP2 scanning the magnetic tape T, (the second reproduced signal 15a is obtained from the magnetic heads WQ1 and WQ2), the magnetic heads WQ2, WP1, A2, WQ1, WP2 and A1 scan the magnetic tape T in this order as shown in the track pattern in FIG. 3, since the magnetic heads WP1 and WF2 are arranged on the rotary drum with 180 angular distance therebetween.

When positions (tracking positions) of the magnetic heads WP1 and WP2 for reproducing the first reproduced signal 14a at which they scan predetermined recording tracks are deviated from normal reproducing positions, that is, for example, when the magnetic head WQ2 is deviated opposite to the tape running direction in FIG. 3 and scans a portion of a recording track which is to be scanned by the magnetic head WP1 or when the magnetic head WP1 is deviated and scans a portion of a recording track which is to be scanned by the magnetic head WQ2, the values of the amplitude level detection signals for the reproduced signals from the magnetic heads WP1 and WQ2 are reduced. Thus, the value of the tracking control signal and hence the value of the resultant amplitude level detection signal varies with the deviation of the tracking position. Therefore, the relation between the tracking signal and the amplitude level detection signal can be represented by peaks shown by dotted lines in FIG. 20.

The amplitude level detection signals from the integration circuits 20 and 22 are multiplied with each other by the multiplying circuit 23 and the resultant third amplitude level detection signal 23a is supplied to the operation circuit 224.

An operation of the operation circuit 224 will be described with reference to FIGS. 21 to 23. The operation circuit 224 operates to obtain a maximum value of the third amplitude level detection signal 23a, and obtain values X and Y of the tracking control signal 224a when the value of the third amplitude level detection signal 23a is reduced to a certain level lower than a predetermined level and determine the final tracking control signal 224a on the basis of an average value of the values X and Y. "Y" is obtained through the steps S201 to S208 and "X" is obtained through the steps S209 to S215. It should be noted that FIGS. 21 and 22 show operations in cases where the initial value Z of the tracking control signal 224a is in the right side of the peak (value of the tracking control signal is large) and it is in the left side of the peak (value of the tracking control signal is small) respectively, with tracking being shown in approximation to the third amplitude level detection signal 23a.

In FIG. 23, the operation is started and the tracking control signal 224a is reduced in the step S201. Then, in the step S202, it is determined whether or not the third amplitude level detection signal 23a is reduced and, if it is reduced, the operation is advanced to the step S203 and, if not, it returns to the step S201. This operation is repeated until the third amplitude level detection signal is reduced. That is, when the initial value Z1 of the tracking control signal 224a is in the right side of the peak as shown in FIG. 21, the third amplitude level detection signal 23a is increased even if the tracking control signal 224a is reduced. Therefore, the tracking control signal value is reduced until it reaches a predetermined value after passing through a maximum value M of the third amplitude level detection signal, by repeating the steps S202 and S203.

In the step S203, presence or absence of the detection signals 231a and 232a from the SYNC detection circuits 231 and 232 (presence and absence are indicated by "Hi" and "Lo" levels of the detection signal respectively) and, if it is "Lo" and judged as not amplitude level detection signal of the signal to be reproduced, the operation is advanced to the step S201 and, if it is "Hi", it is advanced to the step S204. In the step S204, the tracking amount is increased and, then, it is determined in the step S205 whether or not the value of the third amplitude level detection signal 23a renews a maximum value. If renewed, the operation is advanced to the step S206 and, if not, it is advanced to the step S207.

In the step S206, the maximum value of the third amplitude level detection signal 23a is updated for use in the subsequent processing. After the step S206, the operation is advanced to the step S207. In the step S207, it is determined whether the third amplitude level detection signal 23a is reduced. If reduced, the operation is advanced to the step S208 to set the tracking range "Y" and, if not, it returns to the step S204 and the steps S204 to S207 are repeated until the signal 23a is reduced. That is, the third amplitude level detection signal 23a is reduced after it passes the maximum value M in FIG. 21.

The set tracking range "Y" is stored in a register and, in the step S209, the tracking amount is increased and, in the step S210, the change of the amplitude level detection signal is detected. When the amplitude level detection signal is reduced, the maximum value is renewed. In the step S211, the tracking control signal 224a is reduced and the maximum value is renewed as in the step S205. When the maximum value M is obtained, the reduction of the tracking value in the step S211 is continued until the value of the amplitude level detection signal is reduced to a predetermined amount in the step S214 and the tracking range "X" is set in the step S215. Then, in the step S216, "(X+Y)/2" is operated to obtain the final tracking control signal 224a.

On the other hand, when the initial value Z2 of the tracking control signal 224a is in the left side of the peak as shown in FIG. 22, the value of the tracking control signal is reduced until it reaches the predetermined value without returning from the step S202 to the step S201 and the values "X" and "Y" of the tracking control signal are obtained similarly and "(X+Y)/2" is calculated in the step S216, resulting in the final tracking control signal 224a.

The tracking servo control for the first and second reproduced signals in the two channels can be performed appropriately in this manner.

The amplitude level detection signals of the reproduced signal from the magnetic heads WQ1 and WQ2 and the magnetic heads WP1 and WP2 in one frame period are shown in FIGS. 24(A) and 24(B) respectively. In this case, the signal recorded in the recording tracks are those reproduced by the magnetic heads having azimuth angles identical to the azimuth angles of the recording magnetic heads. Therefore, if the tracking positions of the magnetic heads are deviated from the tracks to be scanned during reproduction, the reproducing magnetic heads scan the tracks which are recorded by the magnetic heads having different azimuth angles, causing reproduced signal to be lost. When the signals recorded on the recording tracks with azimuth angles similar to that of the magnetic heads are reproduced [pseudo azimuth reproduction; q1 and p1 in FIGS. 24(A) and 24(C)], the waveforms qq and pp are obtained on the output signal waveform [FIG. 24(E)] multiplied by the multiplying circuit 23.

In this case, it is impossible to distinguish in processing the third amplitude level detection signal 23a obtained between waveform PQ1 obtained from the first and second amplitude level detection signals 20a and 22a which are obtained from the reproduced signals 14a and 15a and the waveforms qq and pp obtained by erroneous reproduction of the signal recorded with similar azimuth angles.

Figure 24D:
Figure 24E:
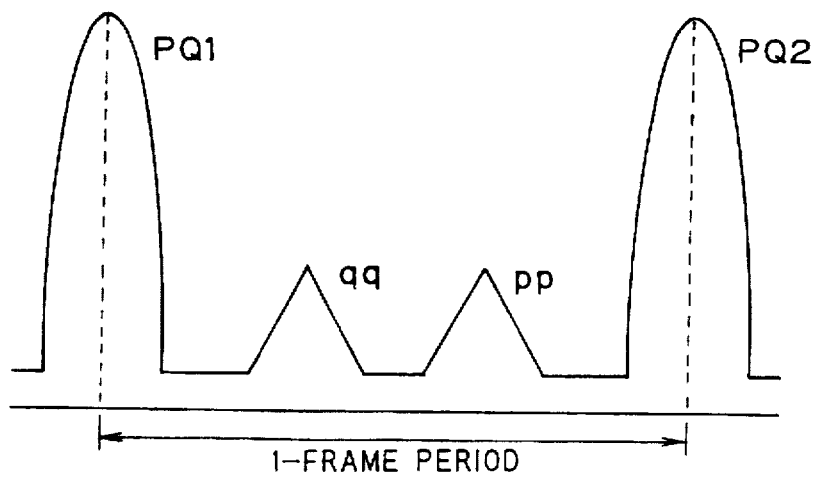

In order to solve this problem, results of the multiplication of the first and second amplitude level detection signals 20a and 22a obtained from the reproduced signals 14a and 15a among the signal waveforms [FIG. 24(E)] outputted from the multiplying circuit 23 are identified by detecting the synchronizing signals which are used as reference for demodulation of the video signal.

The synchronizing signal inserted into the video signal is obtained as a pulse signal sent with a predetermined interval as shown in FIG. 26(A). However, when the amplitude level of the reproduced signal is reduced as mentioned above, acceptable pulse can not be obtained. That is, when the amplitude level of the reproduced signal is reduced, noise is overlapped on the synchronizing signal separated by the previously mentioned separation circuit [FIG. 26(B)]. Therefore, the synchronizing signals separated are supplied to the SYNC detection circuits 231 and 232 to detect them and the operation circuit 224 identifies the multiplication result of the amplitude level detection signals from the reproduced signals on the basis of this result.

Each of the SYNC detection circuits 231 and 232, for example, the SYNC detection circuit 231 is composed of, for example, a low-pass filter (LPF) 231A and a comparator circuit 231B as shown in FIG. 25, and when the amplitude level of the reproduced signal is large (synchronizing signal of acceptable level is obtainable), the synchronizing signal [FIG. 26(A)] is supplied to the LPF 231A as shown in FIGS. 26(A) to 26(C) and a signal [LPF output (E) shown in FIG. 26(C)] having a constant voltage value which is obtained by integrating the synchronizing signal in the LPF 231A, is supplied to the comparator circuit 231B. On the other hand, when the amplitude level of the reproduced signal is small, noise is overlapped on the synchronizing signal [FIG. 26(B)] and the output signal obtained by integrating the synchronizing signal in the LPF 231A has a constant voltage value as shown by an LPF output (D) in FIG. 26(C), which is supplied to the comparator circuit 231B.

Thus, it is possible to determine whether the synchronizing signal is obtained or noise is overlapped thereon, on the basis of a predetermined reference voltage set in the comparator circuit 231B. That is, when the synchronizing signal is integrated by the LPF 231A, frequency components of the synchronizing signal having no noise differ from that of the synchronizing signal having noise and thus there is a difference in voltage of the signal to be supplied to the comparator circuit 231B. Therefore, by setting the reference voltage thereof in the voltage level difference, it is possible to determine whether or not noise is overlapped on the synchronizing signal. When an acceptable synchronizing signal is obtained according to this determination, the detection signals 231a and 232a are supplied to the operation circuit 224.

Thus, the detection signals 231a [FIG. 24(B)] and 232a [FIG. 24(D)] are supplied correspondingly with the first and second amplitude level detection signals 20a and 22a as shown in FIGS. 24(A) to 24(E). The detection signals 231a and 232a in "Hi" state are obtained simultaneously correspondingly with the first and second amplitude level detection signals 20a and 22a, under this condition only when the magnetic heads are scanning the recording tracks to be reproduced. That is, during the pseudo azimuth reproduction, at least one of the detection signals 231a and 232a obtained is in "Lo" state. Therefore, the output signal waveform PQ1 of the multiplying circuit 23 when the detection signals 231a and 232a both of which are in "Hi" state are obtained, is processed as mentioned previously.

It is possible to perform the precise tracking servo control by supplying the tracking control signal 224a obtained in the operation circuit 224 to the capstan servo control system which is not shown to make a rotational phase of the capstan variable to thereby control the running of the magnetic tape T.

FIGS. 27 and 28 show modifications of the SYNC detection circuits 231 and 232 respectively. In FIG. 27, the SYNC circuit includes a band-pass filter (BPF) 231C in addition to a low-pass filter (LPF) 231D and a comparator circuit 231E so that only frequency band of the input synchronizing signal is passed to remove random noise thereof and supplied to the LPF 231D and the integration value obtained by the LPF 231D is large only when the sufficient synchronizing signal is obtained. On the other hand, when noise component is overlapped on the synchronizing signal, the input signal is reduced by the BPF 231C and the integration value obtained by the LPF 231D is reduced. By comparing these values in the comparator circuit 231E, it is possible to perform a more reliable synchronizing signal detection.

In FIG. 28, the SYNC detection circuit 231 (232) includes an automatic frequency control (AFC) circuit 231F and a gate circuit 231G in addition to an LPF 231H and a comparator 231I. With this construction, when the synchronizing signal [FIG. 29(A)] is inputted to the AFC circuit 231F and the gate circuit 231G, the AFC circuit 231F outputs a series of pulses shown in FIG. 29(B) having the same width as that of the synchronizing signal, which is synchronized with the synchronizing signal and is supplied to the gate circuit 231G. The gate circuit 231G supplies only the input synchronizing signal during a gated period on the basis of the input pulse to the LPF 231D [FIG. 29(C)].

Therefore, it is possible to completely remove noise component in the synchronizing signal portion which is not gated. Further, similarly to the SYNC detection circuit 231 (232) shown in FIG. 28, the integration value obtained by the LPF 231H is large only when the sufficient synchronizing signal is obtained and, by detecting this value by the comparator circuit 231I, it is possible to perform a more reliable synchronizing signal detection. Further, it is of course, possible to remove non-standard signal such as noise components by narrowing a lock range of the AFC circuit 231F.

The sixth embodiment considers a plurality of signals reproduced from the respective magnetic heads totally, in performing a tracking servo control of them. However, there is a drawback in that the control itself is complicated due to construction thereof. According to the seventh embodiment, the control is made simpler by simplifying the construction by removing the rectifier circuit 21, the integration circuit 22 and the multiplying circuit 23 in the sixth embodiment, as shown in FIG. 30.

That is, only the first amplitude level detection signal 20a obtained by supplying the first reproduced signal 14a obtained similarly to the sixth embodiment, to the rectifier circuit 19 and to the integration circuit 20, is supplied to an operation circuit 225 which outputs a tracking control signal 225a on the basis of the detection signal 231a and 232a supplied from the SYNC detection circuits 231 and 232, and supplies the tracking control signal 225a to a capstan servo control system, which is not shown, to make rotational phase of a capstan variable to thereby perform a magnetic tape running control.

Assuming, for example, the first amplitude level detection signal 20a [FIG. 24(A)] and the detection signals 231a [FIG. 24(B)] and 232a [FIG. 24(D)] are supplied to the operation circuit 225, waveform peaks Q1, q1 and Q2 which are obtained within one frame of scanning of the magnetic tape T by the magnetic head appear on the waveform of the first amplitude level detection signal 20a as shown in FIGS. 24(A) to 24(E). As mentioned previously, a simultaneous detection of the detection signals 231a and 232a is assumed that the magnetic heads are scanning the recording tracks on which the signals to be reproduced are recorded and on the basis of this assumption, the peak Q1 on the amplitude level detection signal is identified and operated.

That is, the tracking servo control is performed so that the first reproduced signal 14a is obtained at the highest level by obtaining the tracking control signal 225a for the maximum value "P" (FIG. 20) of the first amplitude level detection signal 20a.

For the second reproduced signal 15a, the tracking servo control can be substantially performed by controlling the tracking position of the other magnetic head of the pair of magnetic heads mounted on the rotary drum and spaced from each other by 180 degrees as mentioned in connection to the prior art. Therefore, even if the tracking position of the reproduced signal 15a is deviated more or less, it is possible, in the seventh embodiment, to perform the tracking control with a simplified construction, by using the synchronizing signal used in the sixth embodiment.

Although the amplitude level detection signal obtained from the first reproduced signal 14a is used in the seventh embodiment, it is, of course, possible to use an amplitude level detection signal obtained from the second reproduced signal 15a with the same effect.

According to the present invention which includes a multiplying circuit for multiplying output signals of a plurality of amplitude level detection circuits and an operation circuit for generating a tracking control signal for controlling a running of a recording medium on the basis of an output of the multiplying circuit, it is possible to generate a tracking control signal appropriately even in a case where a plurality of signals are to be reproduced simultaneously. Further, since there is no need of providing such operation circuit every reproduced signal, a construction can be simplified.

The construction of the present invention mentioned above can be further simplified by using an adder circuit instead of the multiplying circuit.

According to an embodiment of the present invention which includes a switching circuit for sequentially switching a plurality of reproduced signals with a predetermined period, an amplitude level detection circuit for detecting amplitude level of as output signal of the switching circuit, a level integration circuit for integrating an output signal of the amplitude level detection circuit and a servo control circuit for controlling a running of the recording medium on the basis of an output signal of the integration circuit, it is possible to control the running of the recording medium on the basis of an information of amplitude levels related to the plurality of reproduced signals. Therefore, a signal reproducing apparatus which is suitable to use in reproducing a plurality of signals simultaneously is provided. For example, when the present invention is applied to a VTR, it is possible to reproduce a plurality of signals at appropriate level even in a compatible reproduction.

According to another embodiment of the present invention which includes an operation circuit for generating a tracking control signal from a signal obtained by processing in a predetermined manner on the basis of amplitude level detection signals of a plurality of amplitude level detection circuits, it is possible to generate a tracking control signal which is higher in accuracy than that generated conventionally from a signal obtained by processing in a predetermined manner based on a single amplitude level detection signal. For example, in a case where this tracking control signal is used for capstan servo control, it is possible to perform the capstan servo control more precisely and thus to continuously perform high grade reproducing operation.

According to another embodiment of the present invention which further includes a plurality of multiplying circuits and an operation circuit, it is possible to obtain stably a tracking control signal by unifying a plurality of reproduced signals by multiplication thereof, even when mounting error of magnetic heads related to these reproduced signals is within a predetermined range and peaks of these reproduced signals are not coincident in varying a tracking amount.

According to another embodiment of the present invention, noise component due to the so-called pseudo azimuth reproduction in obtaining a tracking control signal can be completely removed by a level limit circuit. Therefore, it is possible to avoid erroneous operation caused by an amplitude level detection signal obtained by such pseudo azimuth reproduction, etc., and to define a range of tracking position immediately, so that tracking control can be done quickly and precisely.

According to another embodiment of the present invention which further includes a detection signal generator circuit, tracking position range for only normal amplitude level detection signal can be defined by a gate signal obtained from, for example, two kinds of reproduced signals (audio signal) and an operation for obtaining tracking control signal can be performed precisely.

The signal reproducing apparatus according to the present invention includes an amplitude level detection circuit for detecting an amplitude level of at least one of a plurality of reproduced signals reproduced from a recording medium, synchronizing signal detection circuits for detecting synchronizing signals from the respective reproduced signals and a control signal generator circuit for generating a control signal for controlling reproducing scan in reproducing the signals, on the basis of an amplitude level detection signal outputted from the amplitude level detection circuit and detection signals outputted from the respective synchronizing signal detection circuits. Therefore, it is possible to generate a reliable tracking control signal on the basis of the amplitude level detection signal of one of the reproduced signals, for example, the reproduced signal at a time when a synchronizing signal which becomes a reference in demodulating a video signal, is generated. Thus, by supplying it to a capstan servo control system, it is possible to always perform a tracking servo control of a video signal to be reproduced reliably.

The present signal reproducing apparatus further includes a plurality of reproducing circuits for reproducing a plurality of reproduced signals from a plurality of tracks formed on a recording medium, amplitude level detection circuits for detecting amplitude levels of output signals of the plurality of reproducing circuits, synchronizing signal detection circuits for detecting synchronizing signals from the plurality of reproduced signals and a tracking control signal generator circuit for generating a tracking control signal for controlling scanning of the plurality of reproducing devices on the basis of amplitude level detection signals outputted from the amplitude level detection circuits and detection signals outputted from the respective synchronizing signal detection circuits. Therefore, it is possible to reliably remove noise overlapped on the synchronizing signal and to generate a reliable tracking control signal on the basis of the amplitude level detection signal of one of the reproduced signals, for example, the reproduced signal at a time when a synchronizing signal which becomes a reference in demodulating a video signal is generated. Thus, by supplying it to a capstan servo control system, it is possible to always perform a tracking servo control of a video signal to be reproduced reliably.

The present signal reproducing apparatus further includes a plurality of reproducing circuits for reproducing a plurality of reproduced signals from a plurality of tracks formed on a recording medium, an amplitude level detection circuit for detecting amplitude level of at least one of output signals of the plurality of reproducing circuits, synchronizing signal detection circuits for detecting synchronizing signals from the plurality of reproduced signals and a tracking control signal generator circuit for generating a tracking control signal for controlling scanning of the plurality of reproducing devices on the basis of an amplitude level detection signal outputted from the amplitude level detection circuit and detection signals outputted from the respective synchronizing signal detection circuits. Therefore, it is possible to remove the rectifier circuit, the integration circuit and the multiplying circuit of the sixth embodiment. Thus, the tracking control signal can be generated with a simpler construction than that of the sixth embodiment and, by supplying it to a capstan servo control system, it is possible to always perform a tracking servo control of a video signal to be reproduced, reliably.

What is claimed is:

1. A signal reproducing apparatus with a capstan servo system comprising:

a plurality of reproducing means including a plurality of head means adjacent each other for reproducing simultaneously plural channels of video signals prerecorded on separate respective plural tracks on a recording medium, a plurality of amplitude level detection means for detecting amplitude levels of at least two channels of said video signals reproduced simultaneously and directly from said plurality of reproducing means and producing output signals;

multiplying means for producing a unified amplitude signal by multiplying said output signals of said plurality of said amplitude level detection means with each other; and operation means for producing a tracking control signal by obtaining from said unified amplitude signal of said multiplying means, maximum, first and second values of said unified amplitude signal, each of said first and second values being lower than said maximum value by a predetermined amount, said first and second values being developed respectively at first and second levels of said tracking control signal by changing the level of said tracking control signal, whereby said operation means determines the level of said tracking control signal to be supplied to said capstan servo system, by calculating a mean value of said first and second levels of said tracking control system so that said plurality of head means optimally tracks said respective plural tracks.

2. The signal reproducing apparatus claimed in claim 1, wherein the plurality of said amplitude level detection means comprises level limiter means for outputting signals having levels equal to or higher than a predetermined level.

3. A signal reproducing apparatus with a capstan servo system comprising:

a plurality of reproducing means including a plurality of head means adjacent each other for reproducing simultaneously plural channels of video signals prerecorded on separate respective plural tracks on a recording medium;

a plurality of amplitude level detection means for detecting amplitude levels of at least two channels of said video signals reproduced simultaneously and directly from said plurality of reproducing means and producing output signals;

adding means for producing a unified amplitude signal by adding said output signals of said plurality of said amplitude level detection means with each other, and operation means for producing a tracking control signal by obtaining from said unified amplitude signal of said adding means, maximum, first and second values of said unified amplitude signal, each of said first and second values being lower than said maximum value by a predetermined amount, said first and second values being developed respectively at first and second levels of said tracking control signal by changing the level of said tracking control signal, whereby said operation means determines the level of said tracking control signal to be supplied to said capstan servo system, by calculating a mean value of said first and second levels of said tracking control system so that said plurality of head means optimally tracks said respective plural tracks.

4. The signal reproducing apparatus claimed in claim 3, wherein the plurality of said amplitude level detection means comprises level limiter means for outputting signals having levels equal to or higher than a predetermined level.

* * * * *